(12) United States Patent
Vanderveen et al.

(10) Patent No.: US 11,265,707 B2
(45) Date of Patent: *Mar. 1, 2022

(54) ROLL-OVER OF IDENTIFIERS AND KEYS FOR UNICAST VEHICLE TO VEHICLE COMMUNICATION LINKS

(71) Applicant: QUALCOMM Incorporated, San Diego, CA (US)

(72) Inventors: Michaela Vanderveen, Tracy, CA (US); Hong Cheng, Basking Ridge, NJ (US); Junyi Li, Fairless Hills, PA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,948

(22) Filed: Dec. 17, 2020

(65) Prior Publication Data

US 2021/0105618 A1  Apr. 8, 2021

Related U.S. Application Data

(63) Continuation of application No. 16/259,952, filed on Jan. 28, 2019.

(Continued)

(51) Int. Cl.
*H04L 9/32* (2006.01)
*H04L 9/08* (2006.01)
(Continued)

(52) U.S. Cl.
CPC ......... *H04W 12/0433* (2021.01); *H04W 4/06* (2013.01); *H04W 4/40* (2018.02);
(Continued)

(58) Field of Classification Search
CPC ..... H04W 4/40; H04W 12/106; H04W 12/03; H04W 76/11; H04W 4/06; H04W 12/033;
(Continued)

(56) References Cited

U.S. PATENT DOCUMENTS

| 10,454,928 B2 | 10/2019 | Edsall |
| 2007/0043940 A1* | 2/2007 | Gustave ............ H04W 12/037 713/150 |

(Continued)

FOREIGN PATENT DOCUMENTS

WO  WO2017191963 A2  11/2017

OTHER PUBLICATIONS

"3rd Generation Partnership Project; Technical Specification Group Services and System Aspects; Proximity-Based Services (ProSe); Stage 2 (Release 15)", 3GPP Standard; Technical Specification; 3GPP TS 23.303, 3rd Generation Partnership Project (3GPP), Mobile Competence Centre, 650, Route Des Lucioles; F-06921 Sophia-Antipolis Cedex, France, vol. SA WG2, No. V15.0.0, Jun. 12, 2017 (Jun. 12, 2017), pp. 1-131, XP051298388, [retrieved on Jun. 12, 2017].

(Continued)

*Primary Examiner* — Haresh N Patel
(74) *Attorney, Agent, or Firm* — Holland & Hart LLP

(57) ABSTRACT

Methods, systems, and devices for wireless communications are described that improve privacy in wireless communications, such as communications by a user equipment (UE), which may in some cases be a vehicle UE. For example, various vehicle-to-everything (V2X) transmissions may be unencrypted, and a vehicle may be expected to periodically change one or more identifiers it uses for various communication services. Privacy may be enhanced, for example, via encryption key roll-over, as well as roll-over of one or more other identifiers associated with a UE that may poten- (Continued)

tially be used by an observer to track the UE. The UE may transmit a message that includes an updated lower layer identifier (e.g., a layer-2 (L2) identifier) to another UE in a V2X unicast communications link, which may trigger a change in identifiers of a set of identifiers and an updated security context. All or a portion of the message may be encrypted.

30 Claims, 20 Drawing Sheets

Related U.S. Application Data

(60) Provisional application No. 62/677,173, filed on May 28, 2018.

(51) Int. Cl.
| | |
|---|---|
| *H04W 12/0433* | (2021.01) |
| *H04W 4/40* | (2018.01) |
| *H04W 76/11* | (2018.01) |
| *H04W 4/06* | (2009.01) |
| *H04W 12/033* | (2021.01) |
| *H04W 12/041* | (2021.01) |
| *H04W 12/71* | (2021.01) |
| *H04W 12/106* | (2021.01) |
| *H04W 12/55* | (2021.01) |

(52) U.S. Cl.
CPC ....... *H04W 12/033* (2021.01); *H04W 12/041* (2021.01); *H04W 12/106* (2021.01); *H04W 12/71* (2021.01); *H04W 76/11* (2018.02); *H04W 12/55* (2021.01)

(58) Field of Classification Search
CPC ... H04W 12/71; H04W 12/041; H04W 12/02; H04W 12/0433; H04W 4/46; H04W 12/75; H04W 12/0471; H04W 76/14; H04W 12/30; H04W 12/55; H04W 4/44; H04L 61/2053; H04L 67/12; H04L 63/0407; H04L 61/6022; H04L 61/2038
USPC ........................................................ 713/171
See application file for complete search history.

(56) References Cited

U.S. PATENT DOCUMENTS

| | | | |
|---|---|---|---|
| 2009/0300358 A1 | 12/2009 | Pang et al. | |
| 2011/0194697 A1 | 8/2011 | Pang et al. | |
| 2013/0243195 A1* | 9/2013 | Kruegel | H04W 12/04 |
| | | | 380/270 |
| 2015/0295816 A1 | 10/2015 | Roper | |
| 2015/0326537 A1* | 11/2015 | Cheng | H04W 12/02 |
| | | | 380/270 |
| 2015/0358067 A1 | 12/2015 | Zhang et al. | |
| 2016/0110182 A1* | 4/2016 | Barillari | G06F 8/65 |
| | | | 717/171 |
| 2016/0219029 A1* | 7/2016 | Oshida | H04L 9/3247 |
| 2016/0316362 A1* | 10/2016 | Ding | H04W 4/02 |
| 2017/0034847 A1* | 2/2017 | He | H04W 74/06 |
| 2017/0054568 A1* | 2/2017 | Lee | H04L 12/189 |
| 2017/0180989 A1 | 6/2017 | Etzel et al. | |
| 2017/0201506 A1* | 7/2017 | Pang | H04W 12/04 |
| 2017/0289098 A1* | 10/2017 | Chun | H04L 61/103 |
| 2017/0339730 A1 | 11/2017 | Van Phan et al. | |
| 2018/0035477 A1* | 2/2018 | Van Phan | H04L 67/146 |
| 2018/0124656 A1 | 5/2018 | Park et al. | |
| 2018/0160342 A1* | 6/2018 | Park | H04W 36/0007 |
| 2018/0227882 A1* | 8/2018 | Freda | H04W 72/085 |
| 2018/0242127 A1 | 8/2018 | Kwoczek | |
| 2018/0255499 A1* | 9/2018 | Loehr | H04W 76/23 |
| 2018/0270822 A1* | 9/2018 | Chae | H04L 5/0096 |
| 2018/0332351 A1* | 11/2018 | Faurie | H04W 4/70 |
| 2019/0007812 A1* | 1/2019 | Shilov | H04W 4/029 |
| 2019/0037390 A1* | 1/2019 | Hooda | H04L 45/021 |
| 2019/0053251 A1* | 2/2019 | Loehr | H04W 72/1263 |
| 2019/0058986 A1* | 2/2019 | Loehr | H04L 1/1812 |
| 2019/0116586 A1* | 4/2019 | Basu Mallick | H04W 72/02 |
| 2019/0116609 A1* | 4/2019 | Feng | H04W 4/46 |
| 2019/0149279 A1 | 5/2019 | Lee et al. | |
| 2019/0150225 A1* | 5/2019 | Mohamed | H04W 76/12 |
| | | | 370/329 |
| 2019/0159018 A1* | 5/2019 | Basu Mallick | H04W 4/023 |
| 2019/0182639 A1* | 6/2019 | Basu Mallick | H04W 8/24 |
| 2019/0182840 A1* | 6/2019 | Feng | H04W 4/44 |
| 2019/0200410 A1* | 6/2019 | Hoglund | H04W 68/005 |
| 2019/0230723 A1* | 7/2019 | Kim | H04W 68/02 |
| 2019/0313375 A1* | 10/2019 | Loehr | H04W 72/04 |
| 2019/0364424 A1 | 11/2019 | Vanderveen et al. | |
| 2019/0387429 A1* | 12/2019 | Basu Mallick | H04W 40/04 |
| 2020/0195389 A1* | 6/2020 | Basu Mallick | H04L 1/08 |
| 2020/0260511 A1 | 8/2020 | Kim | |
| 2020/0336870 A1 | 10/2020 | Back et al. | |

OTHER PUBLICATIONS

Internationalsearch Report and Written Opinion—PCT/US2019/033732—ISA/EPO—dated Aug. 21, 2019.
Qualcomm Incorporated., et al., "Unicast and Multicast V2X Communication Support Over PC5", SA WG2 Meeting #S2-127bis, 3GPP Draft; S2-185211, TR23786 EV2X Unicast Communication Support Over PC5 R3, 3rd Generation Partnership Project (3GPP), Mobile Competence Centre, 650, Route Des Lucioles; F-06921 Sophia-Antipolis Cedex, vol. SA WG2 May 27, 2018 (May 27, 2018), pp. 1-7, XP051448712. Retrieved from the Internet: URL: http://www.3gpp.org/ftp/Meetings_3GPP_SYNC/SA2/Docs/ [retrieved on May 27, 2018].

* cited by examiner

ROLL-OVER OF IDENTIFIERS AND KEYS FOR UNICAST VEHICLE TO VEHICLE COMMUNICATION LINKS

CROSS REFERENCES

The present Application for Patent is a Continuation of U.S. patent application Ser. No. 16/259,952, now U.S. Patent Publication No. 2019/0364424A1, by VANDERVEEN et al., entitled "ROLL-OVER OF IDENTIFIERS AND KEYS FOR UNICAST VEHICLE TO VEHICLE COMMUNICATION LINKS" and filed Jan. 28, 2019, which claims the benefit of U.S. Provisional Patent Application No. 62/677,173 by VANDERVEEN et al., entitled "IDENTIFIERS AND KEYS ROLL-OVER FOR UNICAST VEHICLE TO VEHICLE COMMUNICATION LINKS" and filed May 28, 2018, each of which is assigned to the assignee hereof and expressly incorporated by reference herein.

BACKGROUND

The following relates generally to wireless communications, and more specifically to roll-over of identifiers and keys for unicast vehicle to vehicle communication links.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as distributed wireless networks, wireless devices (e.g., UEs) may directly communicate with each other (e.g., via sidelink communications) and may support various radio frequency and/or baseband capabilities. In some cases, direct communications between wireless devices may include direct communications between vehicles and systems that use such communications may sometimes be referred to as vehicle-to-everything (V2X) communication systems. V2X communication links may be configured to convey important information between vehicles regarding inclement weather, nearby accidents, road conditions, and/or the activities of nearby vehicles, for example. V2X communication systems may also be used by autonomous or semi-autonomous vehicles (e.g., self-driving vehicles or vehicles that provide driver assistance) and may provide extra information beyond the reach of the vehicle's existing system. Such V2X communications links may provide certain safety-related information (e.g., location, direction of travel, velocity, etc.) in unencrypted messages so that other vehicles may receive such information.

SUMMARY

The described techniques relate to improved methods, systems, devices, and apparatuses that support roll-over of identifiers and keys for unicast vehicle to vehicle communication links. Various vehicle-to vehicle or vehicle-to-everything (V2X) transmissions may be unencrypted. Further, in some cases there may be multiple services running on a user equipment (UE), such as a vehicle UE, which may have different privacy requirements. Such services or connections associated with such services may last a relatively long time, which may increase the risk of passive observers tracking the UE. To preserve privacy, a UE (e.g., vehicle UE) may periodically change one or more identifiers it uses for its communications. For example, various described techniques provide for enhanced privacy by changing keys via an encryption key roll-over procedure, as well as roll-over of one or more other identifiers associated with a UE that may potentially be used by a third party to track a UE. In some cases, a set of identifiers may be associated with a UE which may include one or more lower layer identifiers, security layer identifiers, network/transport layer identifiers, facility layer identifiers, application layer identifiers, or combinations thereof. In some cases, the UE may transmit a message (e.g., a rekey request message) that includes an updated lower layer identifier (e.g., a layer-2 (L2) identifier) to another UE in a V2X unicast communications link, which may trigger a change in identifiers of the set of identifiers. In some cases, all or a portion of the message may be encrypted.

A method of wireless communication is described. The method may include establishing, at a first UE, a V2X unicast communications link between the first UE and a second UE, where the first UE has a first set of identifiers associated with the V2X unicast communications link including a first L2 address, transmitting, from the first UE to the second UE, a message including a second set of identifiers that is different than the first set of identifiers, the second set of identifiers including a second L2 address different from the first L2 address, and communicating with the second UE via the V2X unicast communications link using the second set of identifiers.

An apparatus for wireless communication is described. The apparatus may include a processor, memory in electronic communication with the processor, and instructions stored in the memory. The instructions may be executable by the processor to cause the apparatus to establish, at a first UE, a V2X unicast communications link between the first UE and a second UE, where the first UE has a first set of identifiers associated with the V2X unicast communications link including a first L2 address, transmit, from the first UE to the second UE, a message including a second set of identifiers that is different than the first set of identifiers, the second set of identifiers including a second L2 address different from the first L2 address, and communicate with the second UE via the V2X unicast communications link using the second set of identifiers.

Another apparatus for wireless communication is described. The apparatus may include means for establishing, at a first UE, a V2X unicast communications link between the first UE and a second UE, where the first UE has a first set of identifiers associated with the V2X unicast communications link including a first L2 address, transmitting, from the first UE to the second UE, a message including a second set of identifiers that is different than the first set of identifiers, the second set of identifiers including a second L2 address different from the first L2 address, and communicating with the second UE via the V2X unicast communications link using the second set of identifiers.

A non-transitory computer-readable medium storing code for wireless communication is described. The code may include instructions executable by a processor to establish, at a first UE, a V2X unicast communications link between the first UE and a second UE, where the first UE has a first set of identifiers associated with the V2X unicast communications link including a first L2 address, transmit, from the first UE to the second UE, a message including a second set of identifiers that is different than the first set of identifiers, the second set of identifiers including a second L2 address different from the first L2 address, and communicate with the second UE via the V2X unicast communications link using the second set of identifiers.

In some examples of the method, apparatuses, and non-transitory computer-readable medium described herein, the message includes a rekey request message. In some examples of the method, apparatuses, and non-transitory computer-readable medium described herein, the message includes an encrypted first information element (IE) containing the second L2 address. In some examples of the method, apparatuses, and non-transitory computer-readable medium described herein, the message further includes an encrypted second IE containing a second Internet Protocol (IP) address that may be different than a first IP address of the first set of identifiers. In some examples of the method, apparatuses, and non-transitory computer-readable medium described herein, the entire message may be encrypted based on one or more of the first set of identifiers.

Some examples of the method, apparatuses, and non-transitory computer-readable medium described herein may further include operations, features, means, or instructions for receiving, from the second UE, a response message, where the response message includes a new L2 address of the second UE that may be different than a prior L2 address of the second UE.

In some examples of the method, apparatuses, and non-transitory computer-readable medium described herein, the transmitting the message may include operations, features, means, or instructions for transmitting the message using the second L2 address, and where a message integrity check (MIC) of the message may be based on one or more of the first set of identifiers. In some examples of the method, apparatuses, and non-transitory computer-readable medium described herein, the MIC may be computed based on a session key ($K_{D-secs}$) for direct communications between the first UE and the second UE.

In some examples of the method, apparatuses, and non-transitory computer-readable medium described herein, the second L2 address may be a source L2 address and the message further includes a destination L2 address of the second UE. In some examples of the method, apparatuses, and non-transitory computer-readable medium described herein, the second set of identifiers include at least two identifiers that may be different from corresponding identifiers of the first set of identifiers.

Some examples of the method, apparatuses, and non-transitory computer-readable medium described herein may further include operations, features, means, or instructions for receiving, at the first UE from the second UE, a second message and communicating with the second UE using one or more updated parameters of the second UE that may be determined based on the second message.

In some examples of the method, apparatuses, and non-transitory computer-readable medium described herein, the first set of IDs may include one or more lower layer identifiers, one or more security layer identifiers, one or more network/transport layer identifiers, one or more facility layer identifiers, one or more application layer identifiers, or any combinations thereof.

In some examples of the method, apparatuses, and non-transitory computer-readable medium described herein, the first set of identifiers further include one or more physical layer parameters, the one or more physical layer parameters including one or more of a physical layer resource allocation associated with the first UE or a semi-persistent scheduling (SPS) parameter associated with the first UE.

In some examples of the method, apparatuses, and non-transitory computer-readable medium described herein, the one or more lower layer identifiers include a medium access control (MAC) address or the first L2 address, the one or more security layer identifiers include a temporary certificate, the one or more network/transport layer identifiers include a geonetworking address, the one or more facility layer identifiers include a station identifier or temporary identifier associated with a cooperative awareness message (CAM), decentralized environmental notification message (DENM), or basic safety message (BSM) and the one or more application layer identifiers include an Internet protocol (IP) address.

A method of wireless communication is described. The method may include establishing, at a second UE, a V2X unicast communications link with a first UE, where the first UE has a first set of identifiers associated with the V2X unicast communications link including a first L2 address, receiving, from the first UE, a message including a second set of identifiers that are different than the first set of identifiers, the second set of identifiers including a second L2 address different than the first L2 address, and communicating with the first UE via the V2X unicast communications link using the second set of identifiers.

An apparatus for wireless communication is described. The apparatus may include a processor, memory in electronic communication with the processor, and instructions stored in the memory. The instructions may be executable by the processor to cause the apparatus to establish, at a second UE, a V2X unicast communications link with a first UE, where the first UE has a first set of identifiers associated with the V2X unicast communications link including a first L2 address, receive, from the first UE, a message including a second set of identifiers that are different than the first set of identifiers, the second set of identifiers including a second L2 address different than the first L2 address, and communicate with the first UE via the V2X unicast communications link using the second set of identifiers.

Another apparatus for wireless communication is described. The apparatus may include means for establishing, at a second UE, a V2X unicast communications link with a first UE, where the first UE has a first set of identifiers associated with the V2X unicast communications link including a first L2 address, receiving, from the first UE, a message including a second set of identifiers that are different than the first set of identifiers, the second set of identifiers including a second L2 address different than the first L2 address, and communicating with the first UE via the V2X unicast communications link using the second set of identifiers.

A non-transitory computer-readable medium storing code for wireless communication is described. The code may include instructions executable by a processor to establish, at a second UE, a V2X unicast communications link with a first UE, where the first UE has a first set of identifiers associated with the V2X unicast communications link including a first L2 address, receive, from the first UE, a message including a second set of identifiers that are different than the first set of identifiers, the second set of identifiers including a second L2 address different than the first L2 address, and communicate with the first UE via the V2X unicast communications link using the second set of identifiers.

In some examples of the method, apparatuses, and non-transitory computer-readable medium described herein, the message includes a rekey request message. In some examples of the method, apparatuses, and non-transitory computer-readable medium described herein, the message includes an encrypted first IE containing the second L2 address. In some examples of the method, apparatuses, and non-transitory computer-readable medium described herein, the message further includes an encrypted second IE containing a second IP address that may be different than a first IP address of the first set of identifiers. In some examples of the method, apparatuses, and non-transitory computer-readable medium described herein, the entire message may be encrypted based on one or more of the first set of identifiers.

Some examples of the method, apparatuses, and non-transitory computer-readable medium described herein may further include operations, features, means, or instructions for transmitting, to the first UE, a response message, where the response message includes a new L2 address of the second UE that may be different than a prior L2 address of the second UE.

In some examples of the method, apparatuses, and non-transitory computer-readable medium described herein, the receiving the message may include operations, features, means, or instructions for receiving the message having the second L2 address and determining that the message may be from the first UE based on a MIC of the message, where the MIC of the message may be based on one or more identifiers of the first set of identifiers. In some examples of the method, apparatuses, and non-transitory computer-readable medium described herein, the MIC may be computed based on a session key ($K_{D\text{-}sess}$) for direct communications between the first UE and the second UE.

In some examples of the method, apparatuses, and non-transitory computer-readable medium described herein, the second L2 address may be a source L2 address and the message further includes a destination L2 address of the second UE. In some examples of the method, apparatuses, and non-transitory computer-readable medium described herein, the second set of identifiers include at least two identifiers that may be different from corresponding identifiers of the first set of identifiers.

Some examples of the method, apparatuses, and non-transitory computer-readable medium described herein may further include operations, features, means, or instructions for transmitting, to the first UE, a second message to update a third set of identifiers associated with the second UE and communicating with the first UE using a fourth set of identifiers that may be determined based on the second message, where the fourth set of identifiers may be different than the third set of identifiers.

In some examples of the method, apparatuses, and non-transitory computer-readable medium described herein, the first set of identifiers include one or more lower layer identifiers, one or more security layer identifiers, one or more network/transport layer identifiers, one or more facility layer identifiers, one or more application layer identifiers, or any combinations thereof.

In some examples of the method, apparatuses, and non-transitory computer-readable medium described herein, the first set of identifiers further include one or more physical layer parameters, the one or more physical layer parameters including one or more of a physical layer resource allocation associated with the first UE or a SPS parameter associated with the first UE.

In some examples of the method, apparatuses, and non-transitory computer-readable medium described herein, the one or more lower layer identifiers include a MAC address, the one or more security layer identifiers include a temporary certificate, the one or more network/transport layer identifiers include a geonetworking address, the one or more facility layer identifiers include a station identifier or temporary identifier associated with a CAM, DENM, or BSM and the one or more application layer identifiers include an IP address.

DETAILED DESCRIPTION

Figure 1:
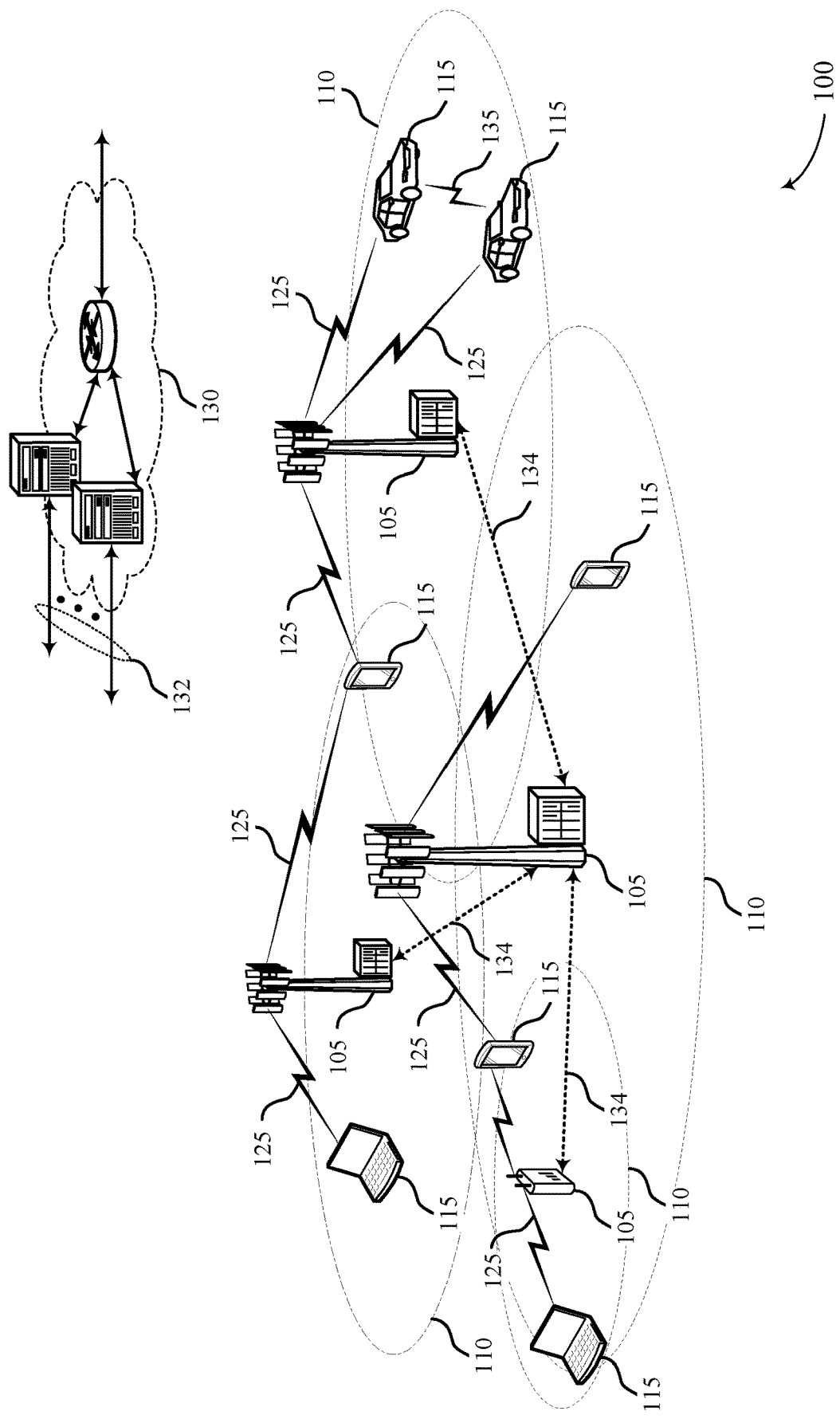
FIG. 1 illustrates an example of a system for wireless communications that supports roll-over of identifiers and keys roll-over for unicast vehicle to vehicle communication links in accordance with aspects of the present disclosure.

Some wireless communication systems may be used to facilitate communications with various devices, which may include vehicles and these systems may sometimes be referred to as vehicle-to-everything (V2X) communication systems. V2X communication systems may be configured to convey important information between vehicles in one or more unencrypted messages that may lead to potential tracking by a third party. Various aspects described herein provide for roll-over of one or more UE identifiers and security keys that may inhibit tracking of the UE while continuing to provide important safety-related information. As used herein, the term "roll-over" may refer to a change or update in information such as security keys or UE identifiers. For example, a roll-over may refer to a change from a first set of one or more security keys or UE identifiers to a second set of one or more security keys or UE identifiers. In some cases, a set of identifiers may be associated with a UE which may include one or more lower layer identifiers, security layer identifiers, network/transport layer identifiers, facility layer identifiers, application layer identifiers, or combinations thereof. In some cases, the UE may transmit a message (e.g., a rekey request message) that includes an updated lower layer identifier (e.g., a layer-2 (L2) identifier) to another UE in a V2X unicast communications link, which may trigger a change in identifiers of the set of identifiers. In some cases, all or a portion of the message may be encrypted.

As indicated above, in some cases, V2X communications may be used to transmit information between vehicles. In some cases, one-to-one communications between vehicles may be established via sidelink communications between UEs associated with vehicles that provide unicast V2X communications between a first UE at a first vehicle and a second UE at a second vehicle. For example, such V2X communications may provide information to a driver regarding inclement weather, nearby accidents, road conditions, or the activities of nearby vehicles, and the like. V2X communication systems may also be used by autonomous vehicles (self-driving vehicles) and may provide extra information beyond the reach of the vehicle's existing system. For example, a sensor device in a first vehicle may transmit sensor information to a second vehicle (e.g., indicative of objects or conditions in the vicinity of the sensor, a video feed of the first vehicle to enhance a line-of-sight at the second vehicle, etc.). The second vehicle may receive the information and may thereby determine whether and how to take action based on the sensed objects or conditions.

As also indicated above, various V2X transmissions may be unencrypted. For example, a vehicle may transmit global positioning system (GPS) position information, direction information, velocity information, and the like in periodic broadcast transmissions that may be received by any other vehicle UE in proximity to the transmitting vehicle UE. To preserve privacy of location during a journey while allowing short-term tracking algorithms to run (e.g., for exchange of safety information in a driving application), a vehicle may be expected to periodically change the identifiers it uses for its communication. In some cases, there can be multiple services running on the UE, which may have different privacy requirements. In the case of a unicast V2X connection, such connections may last a relatively long time, potentially eroding privacy by allowing longer term tracking by passive observers. Various techniques as discussed herein provide for enhanced privacy by changing keys and IDs associated with a UE in a manner that helps to reduce the ability of longer term tracking by passive observers.

Aspects of the disclosure are initially described in the context of a wireless communications system. Aspects of the disclosure are further illustrated by and described with reference to apparatus diagrams, system diagrams, and flowcharts that relate to roll-over of identifiers and keys for unicast vehicle to vehicle communication links.

FIG. 1 illustrates an example of a wireless communications system 100 that supports roll-over of identifiers and keys for unicast vehicle to vehicle communication links in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, wireless communications system 100 may support V2X communications between UEs 115, such as through proximity-based services (ProSe) which provide techniques for ProSe direct discovery of UEs 115 and for ProSe direct communication between UEs 115.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink 135 (e.g., using a peer-to-peer (P2P), device-to-device (D2D) protocol, or ProSe direct communications). Sidelink communication may be used for D2D media-sharing, vehicle-to-vehicle (V2V) communication, V2X communication (or cellular V2X (cV2X) communication), emergency rescue applications, etc. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer, or network/transport layer may be IP-based for different applications in an application layer. In cases where D2D or V2X communications are used, a V2X layer may provide related protocols, and in some cases may use ProSe direct communications protocols (e.g, PC5 signaling). An access stratum may have a number of lower layers, which may include a Packet Data Convergence Protocol (PDCP) layer, a Radio Link Control (RLC) layer that may in some cases perform packet segmentation and reassembly to communicate over logical channels, and a Medium Access Control (MAC) layer that may perform priority handling and multiplexing of logical channels into transport channels. The PDCP layer, MAC layer, and RLC layer may sometimes be referred to as layer-2 (L2). The MAC layer may also use hybrid automatic repeat request (HARQ) to provide retransmission at the MAC layer to improve link efficiency. In the control plane, the access stratum may include a Radio Resource Control (RRC) protocol layer that may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, UEs 115 may establish one or more V2X communications links, and techniques discussed herein may support roll-over of identifiers and keys for such V2X communication links. In some cases, a UE 115 may transmit a message to trigger a key roll-over, as well as roll-over of one or more other identifiers associated with the UE 115 that may potentially be used by a third party or passive observer to track the UE 115 Key roll-over may provide for updated integrity keys, encryption keys, or combinations thereof, which may be referred to herein as bearer-level protection keys or simply as 'keys.' In some cases, a set of identifiers may be associated with a UE 115 which may include one or more lower layer identifiers, security layer identifiers, network/transport layer identifiers, facility layer identifiers, application layer identifiers, or combinations thereof. In some cases, the UE 115 may transmit the message that includes an updated lower layer identifier (e.g., a layer-2 (L2) identifier) to another UE 115 in a V2X unicast communications link, which may trigger a change in identifiers of the set of identifiers. In some cases, all or a portion of the message may be encrypted.

Figure 2:
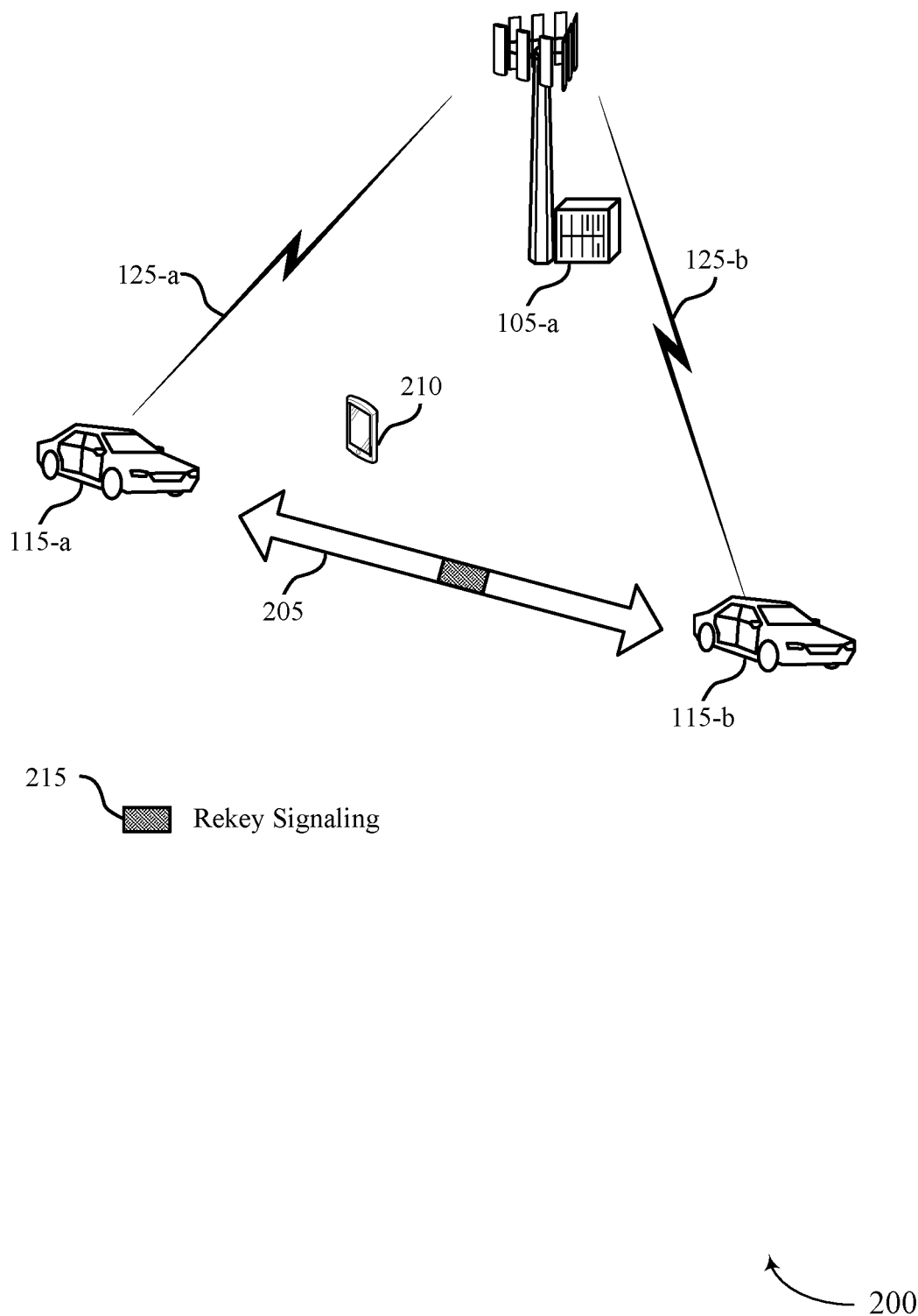
FIG. 2 illustrates an example of a V2X distributed wireless network that supports roll-over of identifiers and keys for unicast vehicle to vehicle communication links in accordance with aspects of the present disclosure.

FIG. 2 illustrates an example of a V2X distributed wireless network 200 that supports roll-over of identifiers and keys for unicast vehicle to vehicle communication links in accordance with aspects of the present disclosure. In some examples, V2X distributed wireless network 200 may implement aspects of wireless communication system 100. V2X system 200 may include a base station 105-*a* and UEs 115-*a*, and 115-*b* that may be present in coverage area 110-*a*. In some cases, UEs 115 may be integrated with a vehicle. UEs 115-*a* and/or 115-*b* may be examples of a UE 115 described with reference to FIG. 1 (e.g. a phone, laptop, vehicle, etc.), and may be configured for V2X communication over one or more carriers (e.g., using ProSe direct communications). In some examples, UEs 115 may execute one or more sets of codes or sequences, to control the functional elements of the device, and perform some or all of the functions described below. In some cases, a communications manager at each UE 115 may manage V2X communications and associated IDs used in the V2X communications. While various examples described herein illustrate V2X communications using LTE or NR between UEs 115, it will be understood that techniques provided herein may be used in other communications systems that may use different RATs and communications protocols.

In some cases, base station 105-*a* may establish communication links 125 with each UE 115-*a* and 115-*b*. In some cases, the base station 105-*a* may provide a configuration to each UE 115 that indicates certain applications that may run at each UE 115. In some cases, each UE 115 may have one or more applications running at an application layer, and a V2X layer at the UE 115 may be configured to provide information from the one or more applications via a V2X unicast communication link 205.

In some cases, as discussed above, a passive observer, such as device 210 may be in proximity of the UEs 115, and may be able to monitor transmissions of each UE 115. For example, the first UE 115-*a* may transmit GPS position information, direction information, and velocity information, in periodic broadcast transmissions, and V2X communications link 205 may be established for one or multiple services running on the first UE 115, which may have different privacy requirements. Further, in some cases the V2X unicast communication link 205 may last a relatively long time, potentially eroding privacy by allowing longer term tracking by passive observer using device 210. In some cases, ProSe communications protocols used for the V2X unicast communication link 205 may provide signaling that can be used to rekey the V2X unicast communication link 205, and thus provide updated keys for the link. Further, in some cases an application running at a UE 115 may update an associated ID to help prevent monitoring.

In some cases, however, one or more other IDs of the first UE 115-*a*, if left un-updated, may be used to infer that the first UE 115-*a* is associated with updated key or updated application ID of a communications link. For example, if a station ID or the pseudonym certificate used to protect the cooperative awareness message (CAM) changes (e.g., due to an application change in the application layer), an application ID of another application (e.g., an IP address) may remain the same thus allowing the passive observer at device 210 to track the first UE 115-*a* over this change in IDs, realizing it is the same UE. In accordance with various techniques described herein, the first UE 115-*a* may transmit rekey signaling 215 that may trigger an update to multiple or all IDs associated with the first UE 115-*a*, which may help to reduce the likelihood that the first UE 115-*a* is able to be tracked by the passive observer at device 210 across keys and IDs roll-over. In some cases, the rekey signaling 215 from the first UE 115-*a* may include a message that may include an updated L2 ID, an updated IP address of the first UE 115, one or more other updated IDs, or any combinations thereof. Such techniques may allow V2X communications in which keys and IDs may roll-over without needing to re-establish the L2 link (from scratch or otherwise), which may cause interruption to the service/traffic, and loss of context information.

Figure 3:
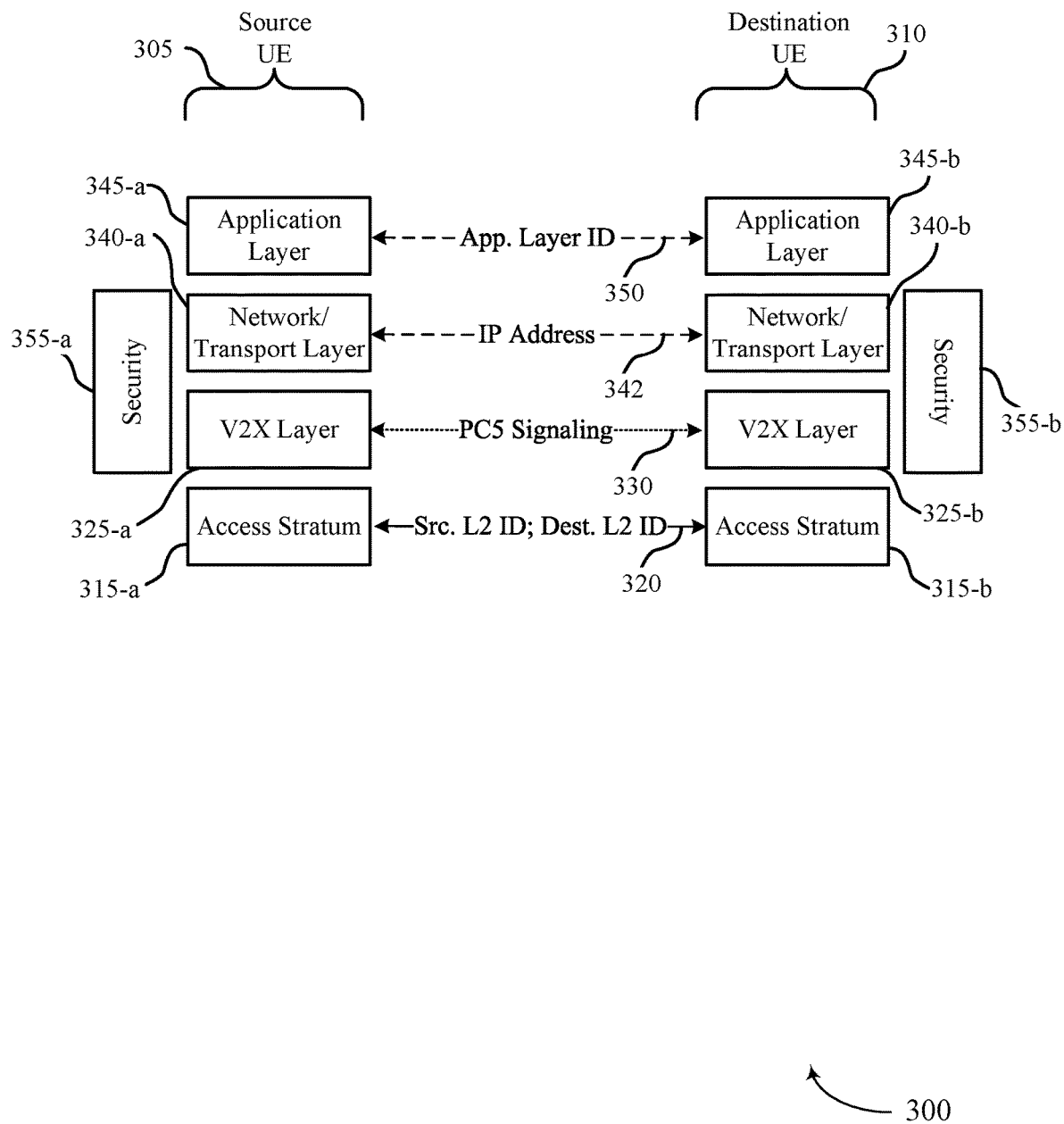
FIG. 3 illustrates an example of a protocol stack that supports roll-over of identifiers and keys for unicast vehicle to vehicle communication links in accordance with aspects of the present disclosure.

FIG. 3 illustrates an example of a protocol stack 300 that supports roll-over of identifiers and keys for unicast vehicle to vehicle communication links in accordance with aspects of the present disclosure. In some examples, protocol stack 300 may implement aspects of wireless communication system 100. As indicated above, a V2X unicast communications link may be used for communications between two vehicles. For example, a source UE 305 (which may also be referred to in various examples as a first UE) at a first vehicle, may establish a V2X communications link with a destination UE 310 (which may also be referred to in various examples as a second UE) at a second vehicle. In some cases, such a V2X unicast communications link may be established using established ProSe direct communications techniques, in which protocol stack 300 may include an access stratum layer 315 that may have associated signaling 320 that includes L2 IDs, such as a source L2 ID of the source UE 305 and a destination L2 ID of the destination UE 310. A V2X layer 325 may have associated signaling 330, such as PC5 signaling in ProSe direct communications, used for rekey signaling as well as other lower-layer signaling. A network/transport layer 340 may use the IP protocol or another Transport/Network protocol, to service one or more applications in application layer 345 which may exchange data 350 based on the transport protocol ID (e.g., IP address 342) or an application layer ID (e.g., Station ID).

In some examples, security management may be provided across network/transport layer 340 and V2X layer 325 and may be provided by security management entity 355. In some cases, the security management entity 355 may trigger pseudonym certificate and MAC address roll-over for enhanced privacy. In some examples as discussed herein, the security management entity 355 may also trigger roll-over of one or more IDs associated with different layers of the protocol stack 300. In some cases, the network/transport layer 340 serving a certain application can request the security management entity 355 for a pseudonym ID (or certificate) lock, which can delay pseudonym and MAC address roll-over for a certain period of time (e.g., for 4 minutes).

As indicated, different layers in the protocol stack may be associated with one or more different identifiers. For example, lower layers in the access stratum layer 315 may have an associated MAC address (e.g., IEEE 802.11p or C-V2X L2 address), an associated V2X radio network temporary identifier (V2X RNTI), a semi-persistent scheduling (SPS) configuration that may be used to identify a UE (e.g., if a same SPS is used before and after key/ID roll-over, an observer may infer that it is for the same UE), one or more physical layer resource allocations, among others. The V2X layer 355 may have an associated V2X RNTI, and/or a temporary certificate which may be a pseudonym temporary certificate (with an ID of the source UE 305 being a hash thereof), among other IDs. The network/transport layer 340 may have, for example, a geonetworking address associated with the source UE 305, and in some cases an IP address associated with the source UE 305. In some cases, the associated facility layer has an ID (e.g., an ITS station ID or temporaryID) associated with cooperative awareness message (CAM), decentralized environmental notification message (DENM), or basic safety message (BSM) which may be associated with the source UE 305. The application layer 345 may also have one or more IDs associated with applications, such as an IP address. The IDs associated with the source UE 305 may be included in a set of IDs of the source UE 305, and in some cases when the source UE 305 transmits a message, in indication of a new set of IDs may be provided, which may prevent or inhibit a passive observer from tracking the UE. For example, if the source UE 305 changes only its pseudonym certificate, one or more other unchanged IDs may allow tracking, and thus roll-over of all of the IDs may hinder such tracking.

Figure 4:
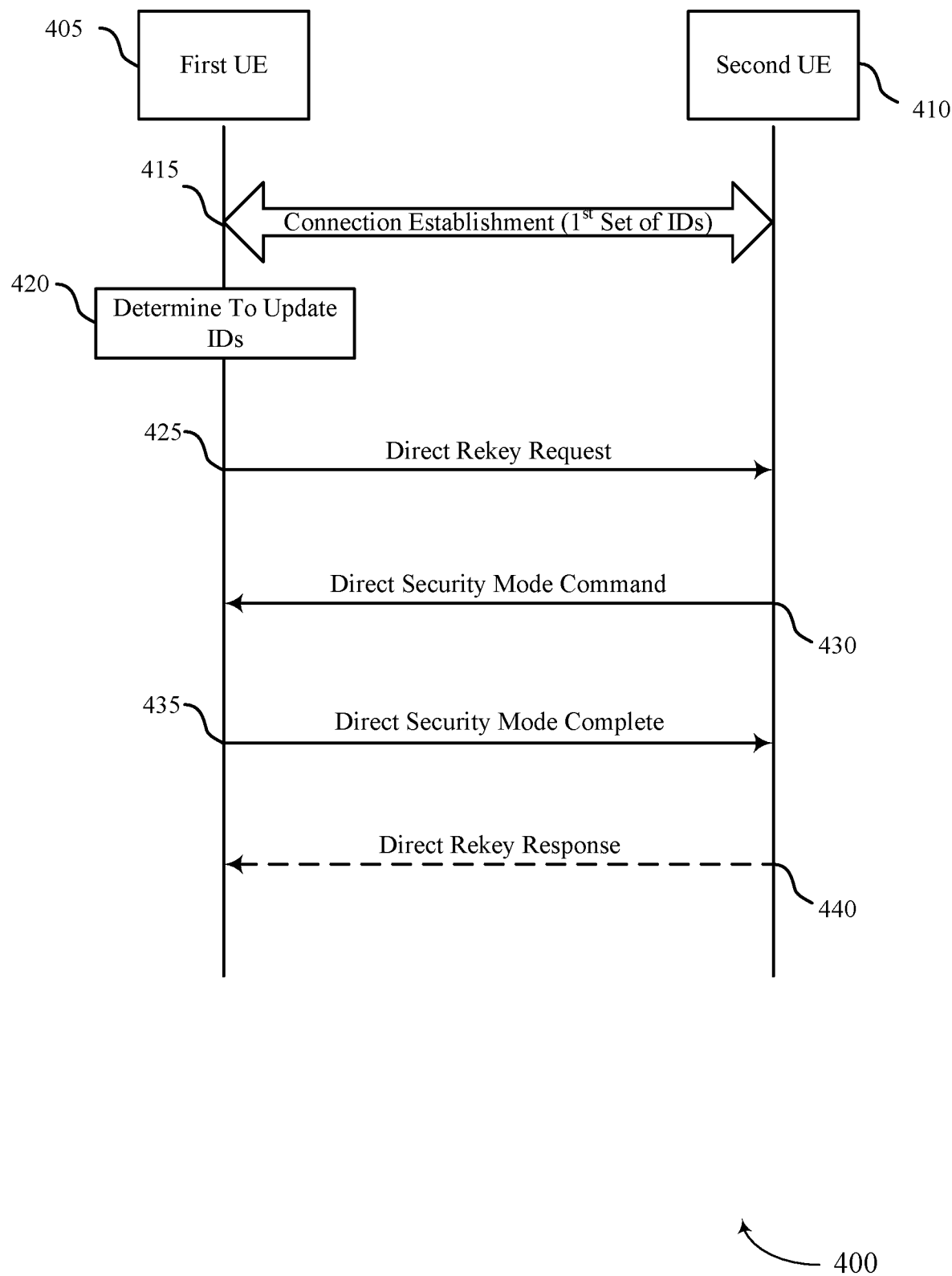
FIG. 4 illustrates an example of a process flow that supports roll-over of identifiers and keys for unicast vehicle to vehicle communication links in accordance with aspects of the present disclosure.

FIG. 4 illustrates an example of a process flow 400 that supports roll-over of identifiers and keys for unicast vehicle to vehicle communication links in accordance with aspects of the present disclosure. In some examples, process flow 400 may implement aspects of wireless communication system 100. Process flow 400 may include a first UE 405 and a second UE 410, and may represent aspects of techniques performed by the corresponding UEs as described with reference to FIGS. 1-3.

At 415, the first UE 405 and the second UE 410 may establish a connection using a first set of IDs. The connection may be a V2X unicast communications link, in some examples, which may be established in accordance with ProSe 1-to-1 communications techniques. In some cases, a security context and security keys may be established as part of the connection establishment (e.g., establishment of a session key (e.g., $K_{D\text{-}sess}$) that may be used to derive bearer-level keys for integrity-protecting and encrypting/decrypting messages (e.g., PIK and PEK)). In some cases, such a connection establishment may include authentication and key establishment, which may involve several messages depending on the type of long term key(s) implemented in the system.

At 420, the first UE 405 may determine to update IDs. Such a determination may be made, for example, based on a timer that expires following the connection establishment or following a prior ID update procedure. In some cases, the first UE 405 may determine to update IDs based on establishment of one or more other connections.

The first UE 405 may transmit a direct rekey request 425 responsive to determining to update IDs. In some cases, the direct rekey request 425 may be transmitted as an unencrypted message in which a message integrity check (MIC) is performed (e.g., using PC5 signaling of ProSe 1-to-1 communications) based on the existing security context. In some cases, the MIC may be computed based on a session key ($K_{D\text{-}sess}$). In some cases, the direct rekey request may include information to update one or more IDs of the set of IDs and information to update security context at the same time. In some cases, the direct rekey request 425 may include an information element (IE), which may be an example of a first IE, that includes an updated L2 ID of the first UE 405. In some cases, the first IE may be encrypted based on the existing security context. Additionally, in some cases the direct rekey request 425 may include a new IP address of one or more applications at the first UE 405, which may be included in a second IE that may be encrypted. In some alternative cases, the entire direct message may be encrypted, instead of just these IEs being encrypted. In some cases, the direct rekey request 425 may be sent using new IDs, but MICed using prior security context information (e.g., prior $K_{D\text{-}sess}$), and the second UE 410 may identify the first UE 405 based on the MIC. In some cases, the direct rekey request 425 has a unique message ID that indicates it is an update to not only the keys but also the IDs, or may have flag to indicate to trigger cross-layer ID updates for the specific L2 unicast link (e.g., to distinguish from legacy PC5 rekey messages).

The second UE 410, responsive to the direct rekey request 425, may update its security context and one or more IDs of the first UE 405, and transmit a direct security mode command 430, that may optionally include updated keys and IDs for the second UE 410. In such cases, the second UE 410 may also update its security context and one or IDs of the set of IDs, such that a passive observer will not be able to track the first UE 405 based on un-updated IDs of the second UE 410. In some cases, a direct rekey response 440 or the direct security mode command 430 may trigger the first UE 405 to establish a new security context and IDs for the second UE 410. The direct security mode command 430 may provide information for updated security keys and indicate that the second UE 410 is ready to receive signaling and user plane traffic with the new security context and new IDs.

The first UE 405 may, responsive to the direct security mode command 430, transmit a direct security mode complete signal 435, that indicates the first UE 405 is ready to send and receive user plane and signaling data with the new security context and IDs, and that the prior context may be deleted. In some cases, the direct security mode complete signal 435 may be encrypted and/or MICed based on the new security context and new IDs.

The second UE 410 may transmit the direct rekey response 440 to complete the procedure. The direct rekey response may indicate that second UE 410 is ready to send and receive user plane and signaling data with the new security context and IDs.

Thus, in the example of FIG. 4, similar signaling as used for PC5 ProSe 1-to-1 communications may be used to trigger both key and ID roll-over between UEs of a unicast V2X communications link. In some cases, other signaling may be used and the specific signaling discussed with respect to FIG. 4 is provided for purposes of discussion and illustration.

Figure 5:
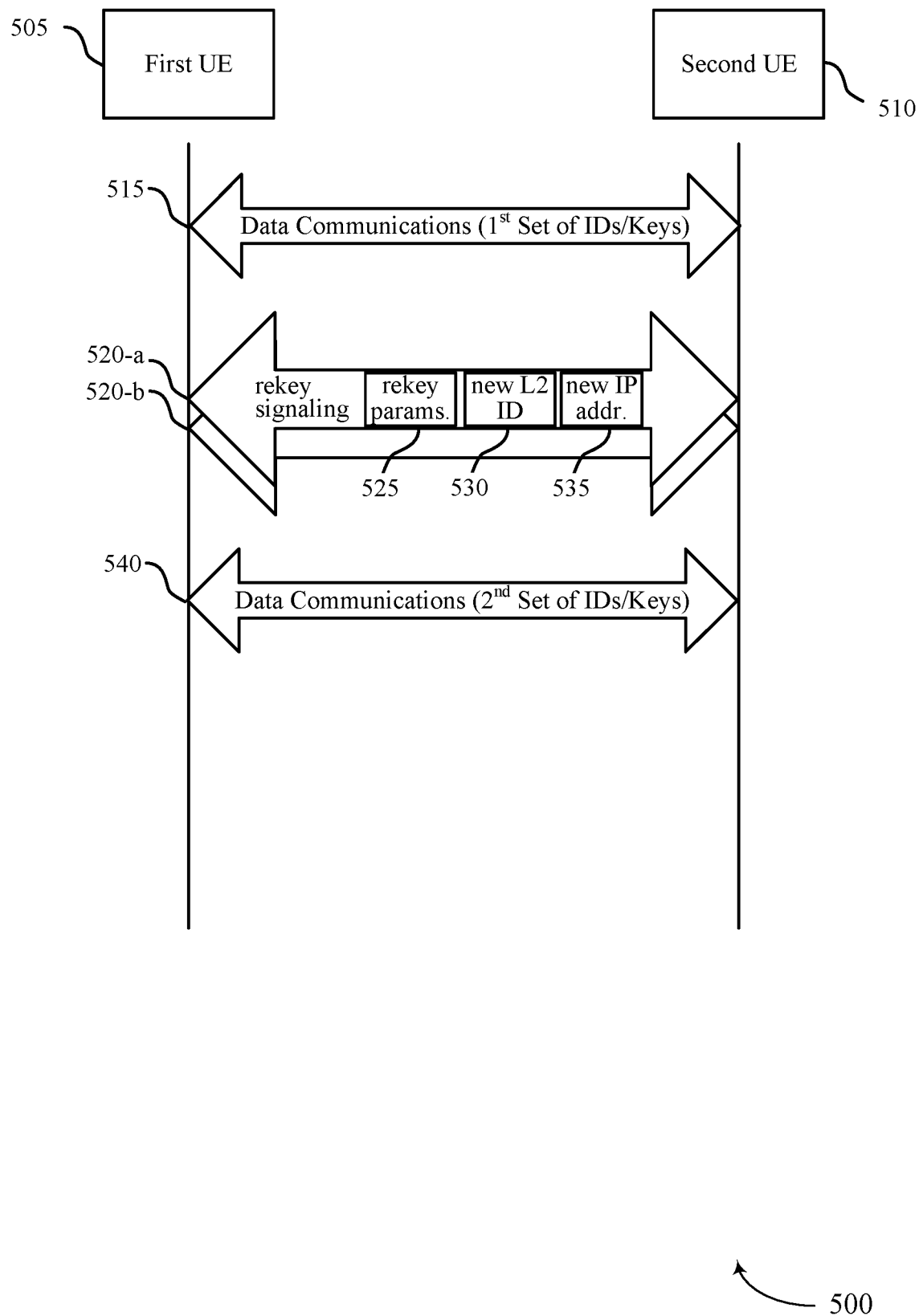
FIG. 5 illustrates an example of a process flow that supports roll-over of identifiers and keys for unicast vehicle to vehicle communication links in accordance with aspects of the present disclosure.

FIG. 5 illustrates an example of another process flow 500 that supports roll-over of identifiers and keys for unicast vehicle to vehicle communication links in accordance with aspects of the present disclosure. In some examples, process flow 500 may implement aspects of wireless communication system 100. Process flow 500 may include a first UE 505 and a second UE 510, and may represent aspects of techniques performed by the corresponding UEs as described with reference to FIGS. 1-3.

At 515, the first UE 405 and the second UE 410 may establish a connection using a first set of IDs and security keys. The connection may be a V2X unicast communications link, similarly as discussed above. In some cases, a security context and security keys may be established as part of the connection establishment (e.g., establishment of an session key (e.g., $K_{D\text{-}sess}$) that may be used to derive bearer-level keys for integrity-protecting and encrypting/decrypting messages (e.g., PIK and PEK)). In some cases, such a connection establishment may include authentication and key establishment, which may involve several messages depending on the type of long term key(s) implemented in the system.

At 520, the first UE 405 and the second UE 410 may exchange rekey signaling that may provide a new security context and new IDs for the set of IDs used to establish the connection. In this example, first rekey signaling 520-*a* may update keys/IDs of the first UE 505, and second rekey signaling 520-*b* may update keys/IDs of the second UE. In some cases, the rekey signaling 520 may include rekey parameters 525 (e.g., session keys, etc.), a new L2 identification 530 (e.g., a new MAC address), and a new IP address 535. In some cases, the new L2 identification 530 may be provided in an encrypted first IE, and the new IP address 535 may be provided in an encrypted second IE, which may be encrypted based on the new security context. In some cases, the all of the rekey signaling 520 transmissions may be encrypted. Such signaling may allow the UEs to indicate new L2 addresses and new IP addresses in an IE that is transmitted with a message, and that may be encrypted.

Following the rekey signaling 520, the first UE 505 and the second UE 510 may exchange data communications 540 via the V2X communications link using the second, updated, set of IDs and keys. The data communications 540 may use updated keys/IDs for both the first UE 505 and the second UE 510, to avoid tracking of the UEs.

Figure 6:
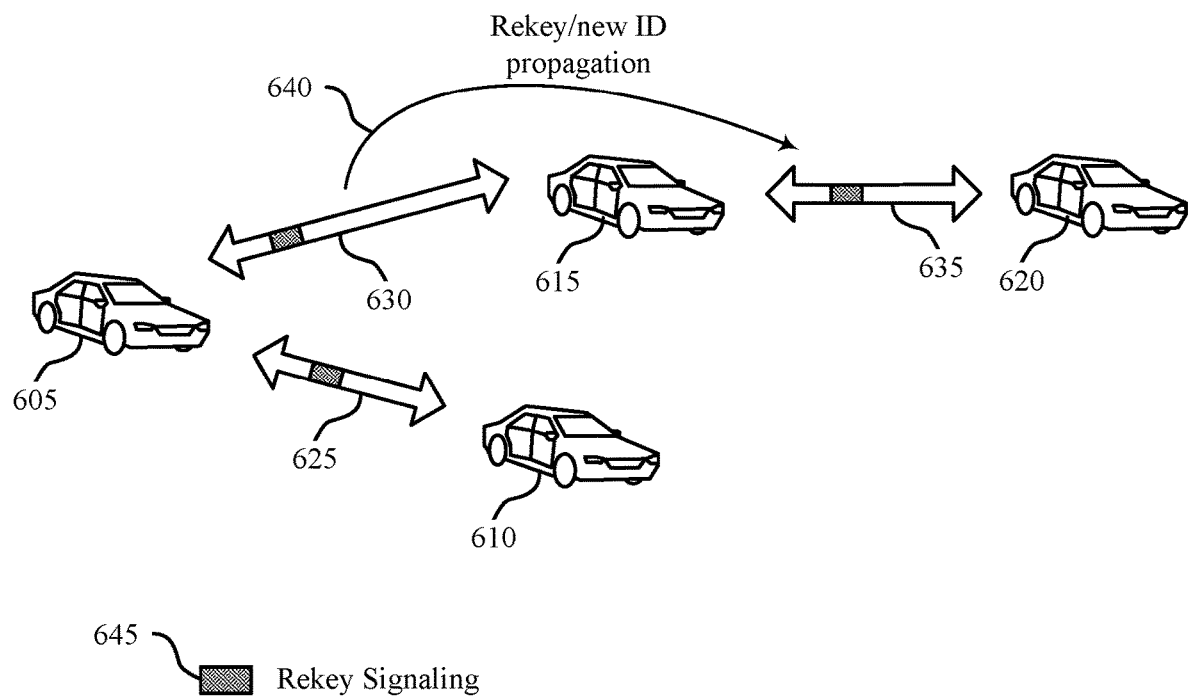
FIG. 6 illustrates an example of a ID/key propagation in a V2X distributed wireless network that supports roll-over of identifiers and keys for unicast vehicle to vehicle communication links in accordance with aspects of the present disclosure.

FIG. 6 illustrates an example of a ID/key propagation in a V2X distributed wireless network 600 that supports roll-over of identifiers and keys for unicast vehicle to vehicle communication links in accordance with aspects of the present disclosure. In some examples, ID/key propagation in a V2X distributed wireless network 600 may implement aspects of wireless communication system 100. In the example of FIG. 6, updated IDs/keys of a first UE may be propagated through multiple UEs to provide further protection against tracking.

In this example, a first UE 605 may have a first connection 625 with a second UE 610 and a second connection 630 with a third UE 615. The third UE 615 may have an associated third connection 635 with a fourth UE 620. In this example, the first UE 605 may perform a first rekeying to establish an updated security context and an updated set of IDs. The first UE 605 may use rekey signaling 645, such as discussed above, to trigger the new security context and IDs to both the second UE 610 and the third UE 615. In such cases, the second UE 610 and third UE 615 may also update their associated keys/IDs. However, in cases where the fourth UE 620 does not update its keys/IDs, an observer may link the third connection 635 to the third UE 615, which may in turn allow the identification of the first UE 605. According to some aspects of the present disclosure, key/ID updates may be propagated to other links of other UEs, as indicated at 640.

Figure 7:
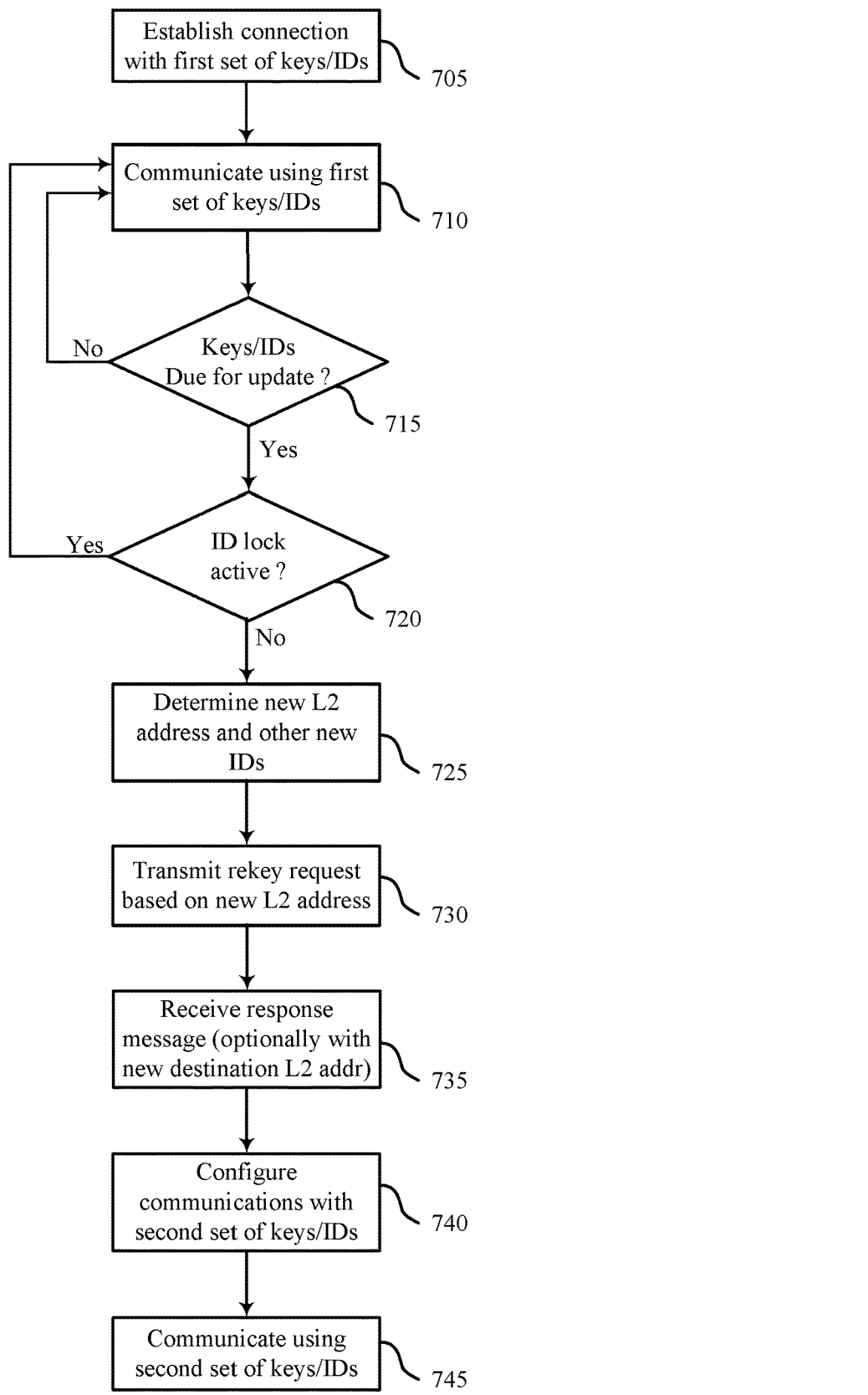
FIG. 7 illustrates an example of a method that supports roll-over of identifiers and keys for unicast vehicle to vehicle communication links in accordance with aspects of the present disclosure.

FIG. 7 illustrates an example of a method 700 that supports roll-over of identifiers and keys for unicast vehicle to vehicle communication links in accordance with aspects of the present disclosure. In some examples, method 700 may implement aspects of wireless communication system 100, 200, or 600. The operations of method 700 may be performed by a source UE, or first UE, as discussed herein.

At 705, the first UE may establish a connection with a second UE with a first set of keys/IDs. The connection may be established, for example, using V2X protocols. In some cases, the connection may be a V2X unicast communications link in which data associated with a second vehicle is provided to a first vehicle, such as sensor data or a camera feed, that may be used to assist with operating the first vehicle.

At 710, the first UE and the second UE may communicate using the first set of keys and IDs. As indicated above, such communications may provide, for example, data associated with a second vehicle, such as sensor data or a camera feed, to be used to assist with operating the first vehicle. In some cases, the first vehicle may be operating in an autonomous or semi-autonomous driving mode, and the data from the second vehicle may provide information to the first vehicle that is outside of the range of the first vehicle's sensors that the first vehicle's sensors are obstructed from receiving. Thus, such communications may provide enhanced safety and control for the first vehicle.

At 715, the first UE may determine whether the keys/IDs associated with the communications link are due to be updated. In some cases, a set of keys/IDs may have an associated lifetime target that may provide for secure and reliable communications while changing with sufficient frequency to hinder observers from tracking the first UE for a relatively long duration of time. In some cases, the first UE may have a timer associated with the keys/IDs, and the determination that an update is due may be based on whether the timer has expired. In the event that the first UE determines at 715 that the keys/IDs are not due for update, the operations at 710 may be continued.

In the event that the first UE determines at 715 that the keys/IDs are due for update, the first UE may determine, at 720, whether an ID lock is active. As discussed above, in some cases, a network/transport layer serving an application may request an ID lock (e.g., for up to four minutes). For example, if an application in the application layer is performing a registration procedure or receiving high-priority communications, the network/transport layer may request that the ID be locked in order to maintain uninterrupted connectivity with relatively low latency. In the event that the first UE determines that an ID lock is active at 720, the operations at 710 may be continued.

In the event that the first UE determines at 720 that an ID lock in not active, the UE may, at 725, determine a new L2 address and one or more other new IDs. As discussed above, the first UE may communicate using a set of IDs, in which one or more IDs may be associated with one or more different protocol layers. In some cases, the first UE may identify an updated ID for each ID of the set of IDs. In some cases, the updated ID may be determined by randomly selecting an updated ID, or by performing a function on an associated ID based on a random number.

At 730, the first UE may transmit a rekey request based on the new L2 address. In some cases, the rekey request may be a message that includes an encrypted IE with the new L2 address. In some cases, the rekey request may be a message transmitted using the new L2 source address that is MICed based on the prior IDs. In some cases, the rekey request may include one or more other IDs of the first UE, such as an IP address, which may also be encrypted. In some cases, the entire rekey request may be encrypted. The message may indicate that a new security context is to be established, and that new IDs of the first UE are to be used for subsequent data transmissions.

At 735, the first UE may receive a response message from the second UE. In some cases, the response message indicates that the rekey request was received and that the second UE is able to communicate using the new keys/IDs. In some cases, the second UE may also determine that its associated IDs and keys are to be updated responsive to the rekey request, and may optionally include a new L2 address of the second UE in the response message, which may be used at the first UE to update keys/IDs of the second UE.

At 740, the first UE may configure communications with a second set of keys/IDs. In some cases, the new IDs may be configured for communications. In some cases, one or more new IDs of the second set of IDs may not be provided with the rekey request, and the first UE may provide an indication of such IDs to the second UE, such as via an encrypted message to the second UE that includes the additional updated IDs.

At 745, the first UE may communicate using the second set of keys/IDs. In some cases, subsequent data transmissions of the first UE may be transmitted using an updated security context, and with updated IDs, based on the second set of IDs. In some cases, the first UE may initiate a timer associated with the second set of keys/IDs, and perform further updates of keys/IDs based on the timer or other criteria for updating keys/IDs.

Figure 8:
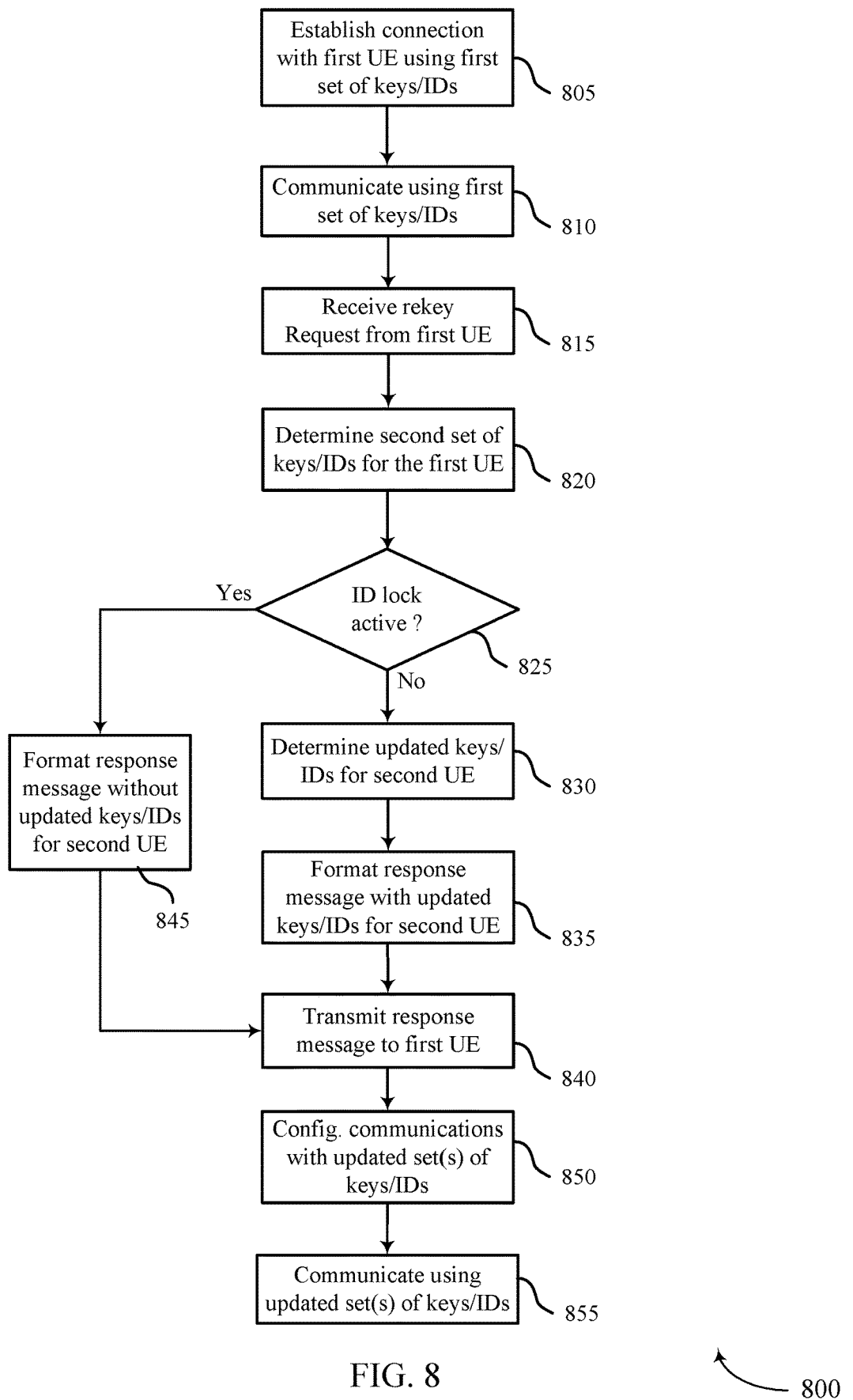
FIG. 8 illustrates an example of a method that supports roll-over of identifiers and keys for unicast vehicle to vehicle communication links in accordance with aspects of the present disclosure.

FIG. 8 illustrates an example of a method 800 at a destination or receiving UE that supports roll-over of identifiers and keys for unicast vehicle to vehicle communication links in accordance with aspects of the present disclosure. In some examples, method 800 may implement aspects of wireless communication system 100, 200, or 600. The operations of method 800 may be performed by a destination UE, or second UE, as discussed herein.

At 805, the second UE may establish a connection with a first UE with a first set of keys/IDs. The connection may be established, for example, using V2X protocols. In some cases, the connection may be a V2X unicast communications link in which data associated with a second vehicle associated with the second UE is provided to a first vehicle associated with the first UE, such as sensor data or a camera feed, that may be used to assist with operating the first vehicle.

At 810, the second UE and the first UE may communicate using the first set of keys and IDs. As indicated above, such communications may provide, for example, data associated with a second vehicle, such as sensor data or a camera feed, to be used to assist with operating the first vehicle. In some cases, the first vehicle may be operating in an autonomous or semi-autonomous driving mode, and the data from the second vehicle may provide information to the first vehicle that is outside of the range of the first vehicle's sensors that the first vehicle's sensors are obstructed from receiving. Thus, such communications may provide enhanced control for the first vehicle.

At 815, the second UE may receive a rekey request from the first UE. In some cases, the rekey request may be a message that includes one or more updated IDs of the first UE. In some cases, the entire rekey request may be encrypted. In other cases, portions of the rekey request may be encrypted. For example, the rekey request may include an encrypted first IE that includes an updated L2 address of the first UE. In some cases, the rekey request may include a number of updated IDs of the first set of keys/IDs. In some cases, the rekey request may include an encrypted second IE that includes an updated IP address of the first UE. In some cases, the rekey request may be a message transmitted using the updated L2 source address that is MICed based on the prior IDs of the first UE. The message may indicate that a new security context is to be established, and that new IDs of the first UE are to be used for subsequent data transmissions.

At 820, the second UE may determine a second set of keys/IDs for the first UE. In some cases, an updated security context and security keys may be determined based on the rekey request. For example, an updated $K_{D\text{-}sess}$ may be derived based on one or more parameters of the rekey request and used to establish the updated security context. In some cases, one or IDs may be determined based on IEs of the message, or may be derived based on information in the message.

At 825, the second UE may determine whether an ID lock at the second UE is active. As discussed above, in some cases, a network/transport layer serving an application may request an ID lock (e.g., for up to four minutes). For example, if an application in the application layer is performing a registration procedure or receiving high-priority communications, the network/transport layer may request that the ID be locked in order to maintain uninterrupted connectivity with relatively low latency.

In the event that the second UE determines that an ID lock not active at 825, the second UE may determine updated keys/IDs for the second UE at 830. In some cases, the second UE may have a third set of keys/IDs that are used for communications, and the second UE may determine a fourth set of keys/IDs, that are different than the third set of keys/IDs, are to be used following the update to the second set of keys/IDs for the first UE.

At 835, the second UE may format a response message to transmit to the first UE with the updated keys/IDs of the second UE. In some cases, the updated keys/IDs of the second UE may be used to determine an updated security context and security keys, and updated IDs, for the second UE in a similar manner as the updated keys/IDs of the first UE. At 840, the second UE may transmit the response message to the first UE.

If it is determined at 825 that the ID lock is active, the second UE, at 845, may format the response message without updated keys/IDs for the second UE. The second UE may then transmit the response message to the UE as indicated at 840.

At 850, the second UE may configure communications using the updated sets of keys/IDs. In some cases, the updated IDs of the second set of IDs may be configured for communications based on the indicated IDs of the rekey request from the first UE. In some cases, one or more updated IDs of the second set of IDs may not be provided with the rekey request, and the first UE may provide an indication of such IDs to the second UE, such as via an encrypted message to the second UE that includes the additional updated IDs.

At 855, the second UE may communicate using the updated sets of keys/IDs. In some cases, subsequent data transmissions of the first UE may be transmitted using an updated security context, and with updated IDs, based on the second set of IDs. In cases where the second UE updated its own keys/IDs, subsequent data transmissions to the first UE, and one or more other UEs, may be transmitted using such updated security context and associated updated IDs.

Figure 9:
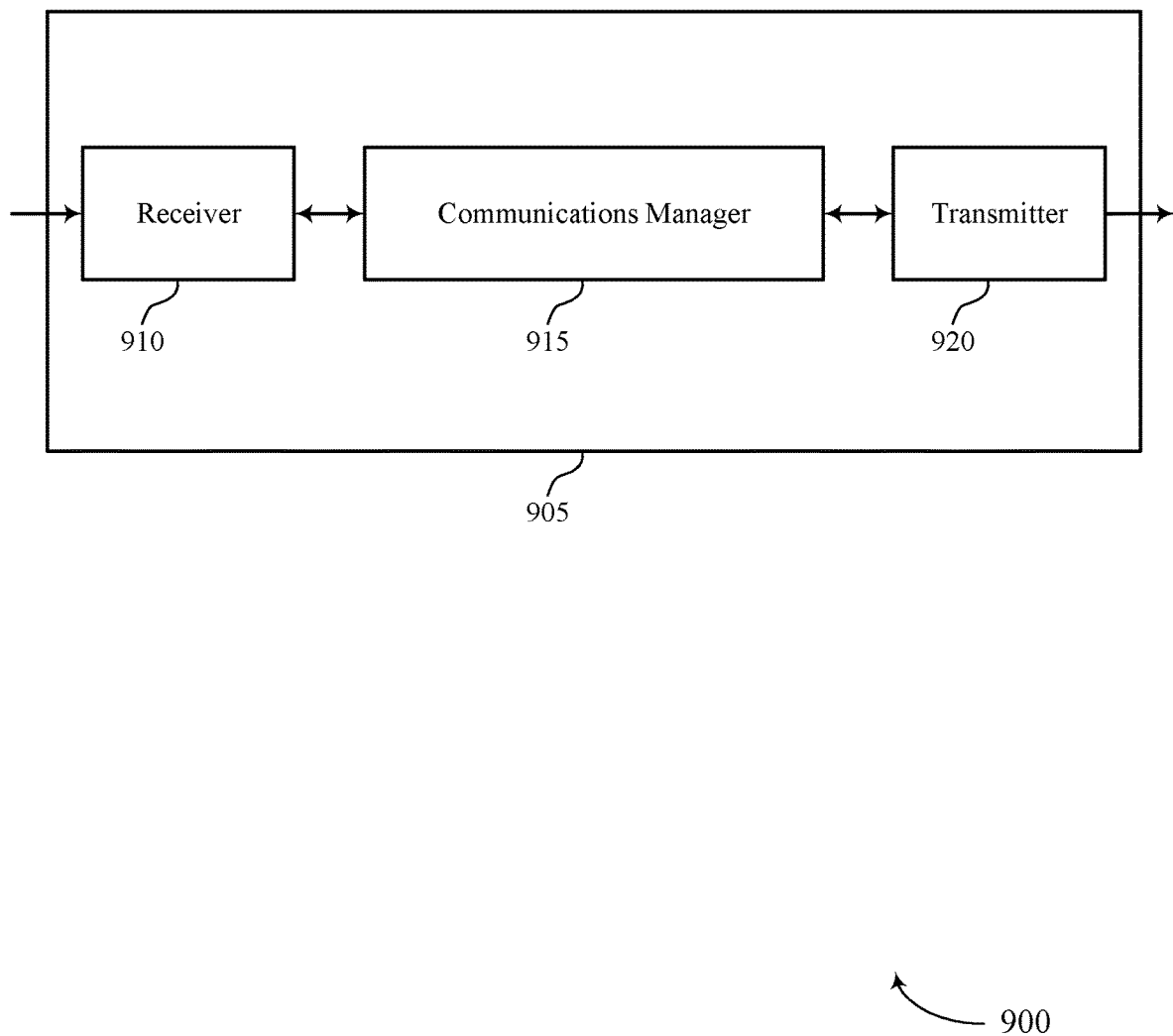
FIGS. 9 and 10 show block diagrams of devices that support roll-over of identifiers and keys for unicast vehicle to vehicle communication links in accordance with aspects of the present disclosure.

FIG. 9 shows a block diagram 900 of a device 905 that supports roll-over of identifiers and keys for unicast vehicle to vehicle communication links in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to roll-over of identifiers and keys for unicast vehicle to vehicle communication links, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may be a component of a first UE that is a transmitter of a message, and may establish a V2X unicast communications link between the first UE and a second UE, where the first UE has a first set of identifiers associated with the V2X unicast communications link including a first L2 address. The communications manager 915 may transmit, from the first UE to the second UE, the message including a second set of identifiers that is different than the first set of identifiers, the second set of identifiers including a second L2 address different from the first L2 address, and communicate with the second UE via the V2X unicast communications link using the second set of identifiers.

In some cases, the communications manager 915 may be a component of a second UE that is a receiver of a message, and may establish a V2X unicast communications link with a first UE, where the first UE has a first set of identifiers associated with the V2X unicast communications link including a first L2 address. The communications manager 915 may receive, from the first UE, the message including a second set of identifiers that are different than the first set of identifiers, the second set of identifiers including a second L2 address different than the first L2 address, and communicate with the first UE via the V2X unicast communications link using the second set of identifiers. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
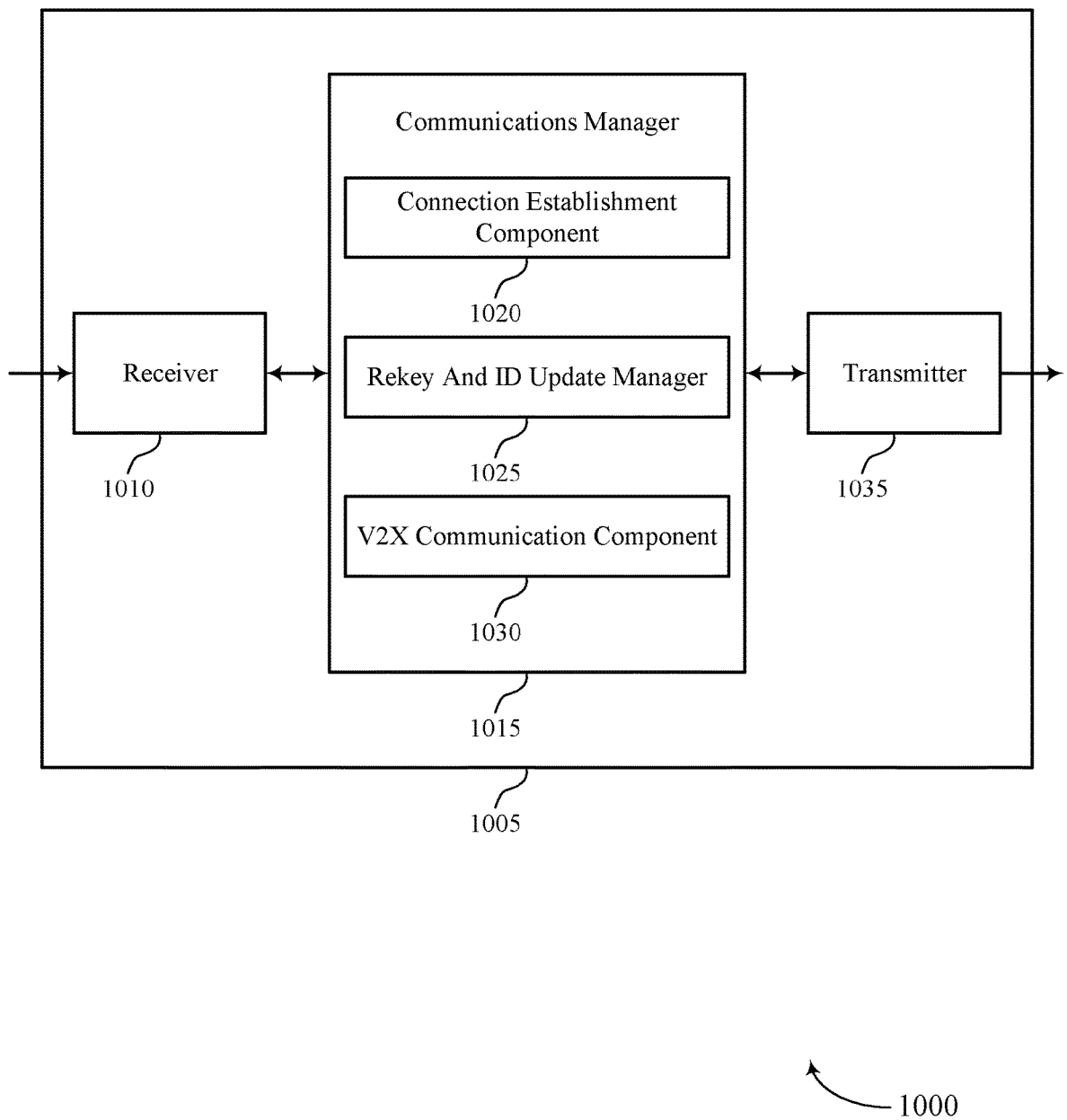

FIG. 10 shows a block diagram 1000 of a device 1005 that supports roll-over of identifiers and keys for unicast vehicle to vehicle communication links in accordance with aspects of the present disclosure. The device 1005 may be an example of aspects of a device 905 or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to roll-over of identifiers and keys for unicast vehicle to vehicle communication links, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection establishment component 1020, a rekey and ID update manager 1025, and a V2X communication component 1030. The communications manager 1015 may be an example of aspects of the communications manager 1210 described herein.

The connection establishment component 1020 may be a component of a first UE that is transmitting a message, and may establish a V2X unicast communications link between the first UE and a second UE, where the first UE has a first set of identifiers associated with the V2X unicast communications link including a first L2 address. The connection establishment component 1020 also may be a component of a second UE that receives a message, and may establish a V2X unicast communications link with a first UE, where the first UE has a first set of identifiers associated with the V2X unicast communications link including a first L2 address.

The rekey and ID update manager 1025, when a component of the first UE, may transmit, from the first UE to the second UE, a message including a second set of identifiers that is different than the first set of identifiers, the second set of identifiers including a second L2 address different from the first L2 address. The rekey and ID update manager 1025, when a component of the second UE, may receive, from the first UE, a message including a second set of identifiers that are different than the first set of identifiers, the second set of identifiers including a second L2 address different than the first L2 address.

The V2X communication component 1030 may manage communications via the V2X unicast communications link using the first or second set of identifiers.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
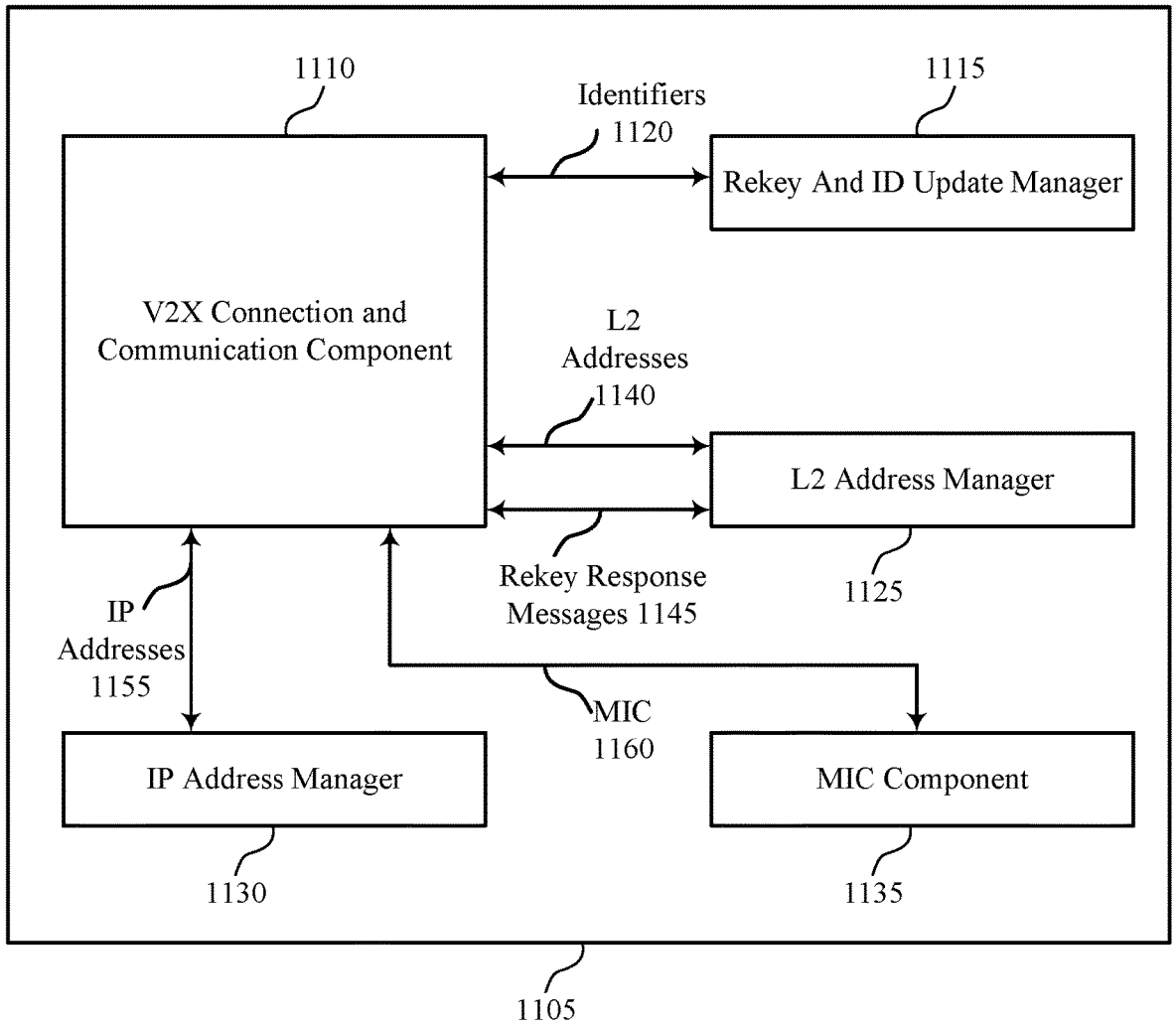
FIG. 11 shows a block diagram of a communications manager that supports roll-over of identifiers and keys for unicast vehicle to vehicle communication links in accordance with aspects of the present disclosure.

FIG. 11 shows a block diagram 1100 of a communications manager 1105 that supports roll-over of identifiers and keys for unicast vehicle to vehicle communication links in accordance with aspects of the present disclosure. The communications manager 1105 may be an example of aspects of a communications manager 915, a communications manager 1015, or a communications manager 1210 described herein. The communications manager 1105 may include a V2X connection and communication component 1110, a rekey and ID update manager 1115, a L2 address manager 1125, an IP address manager 1130, and a MIC component 1135. Each of these modules may communicate, directly or indirectly, with one another (e.g., via one or more buses).

The V2X connection and communication component 1110 may be a component of a first UE that is transmitting a message, and may establish a V2X unicast communications link between the first UE and a second UE, where the first UE has a first set of identifiers 1120 associated with the V2X unicast communications link including a first L2 address 1140. In some examples, the V2X connection and communication component 1110 may be a component of a second UE that receives a message, and may establish a V2X unicast communications link with a first UE, where the first UE has a first set of identifiers 1120 associated with the V2X unicast communications link including a first L2 address 1140.

The V2X connection and communication component 1110 may additionally manage communications between the first UE and the second UE via the V2X unicast communications link using the set of identifiers 1120 associated with the particular UE.

The rekey and ID update manager 1115 of a first UE may exchange with the V2X connection and communication component 1110 identifiers 1120 received or transmitted in the message. The V2X connection and communication component 1110 may transmit, from the first UE to the second UE, a message including a second set of identifiers 1120 that is different than the first set of identifiers 1120, the second set of identifiers 1120 including a second L2 address 1140 different from the first L2 address 1140. In some examples, the rekey and ID update manager 1115 of a second UE may receive, from the first UE and via the V2X connection and communication component 1110, a message including a second set of identifiers 1120 that are different than the first set of identifiers 1120, the second set of identifiers 1120 including a second L2 address 1140 different than the first L2 address 1140.

In some examples, the second UE may transmit a second message to provide roll-over of IDs and security keys of the second UE, and the rekey and ID update manager 1115 at the first UE may receive, from the second UE and via the V2X connection and communication component 1110, the second message. In some examples, the rekey and ID update manager 1115 may update keys and IDs to provide communications between the first and second UE using one or more updated identifiers 1120 that are determined based on the first or second message. In some examples, the message provides the second L2 address 1140 in a first IE. In some examples, the rekey and ID update manager 1115 of the second UE may transmit, to the first UE and via the V2X connection and communication component 1110, a second message to update a third set of identifiers 1120 associated with the second UE to a fourth set of identifiers 1120 associated with the second UE, where the fourth set of identifiers 1120 are different than the third set of identifiers 1120. In some cases, the entire message is encrypted based on one or more of the first set of identifiers 1120.

In some cases, the second set of identifiers 1120 include at least two identifiers that are different from corresponding identifiers of the first set of identifiers 1120. In some cases, the first set of identifiers 1120 include one or more lower layer identifiers, one or more security layer identifiers, one or more network/transport layer identifiers, one or more facility layer identifiers, one or more application layer identifiers, or any combinations thereof. In some cases, the first set of identifiers further include one or more physical layer parameters, the one or more physical layer parameters including one or more of a physical layer resource allocation associated with the first UE or a SPS parameter associated with the first UE.

In some cases, the one or more lower layer identifiers include a medium access control (MAC) address or the first L2 address 1140. In some cases, the one or more security layer identifiers include a temporary certificate. In some cases, the one or more network/transport layer identifiers include a geonetworking address. In some cases, the one or more facility layer identifiers include a station identifier or temporary identifier associated with a CAM, DENM, or BSM. In some cases, the one or more application layer identifiers include an IP address 1155. In some cases, the second set of identifiers 1120 includes different values for each identifier of the first set of identifiers 1120. In some cases, the entire message is encrypted based on one or more of the first set of identifiers 1120.

The L2 address manager 1125 may be a component of the first UE and may receive, from the second UE and via the V2X connection and communication component 1110, a rekey response message 1145, where the rekey response message 1145 includes a new L2 address 1140 of the second UE that is different than a prior L2 address 1140 of the second UE. In some examples, the L2 address manager 1125 may be a component of the second UE and may transmit, to the first UE and via the V2X connection and communication component 1110, a rekey response message 1145, where the rekey response message 1145 includes a new L2 address 1140 of the second UE that is different than a prior L2 address 1140 of the second UE. In some cases, the message, rekey response message 1145, or both, include an encrypted first IE containing the updated L2 address 1140. In some cases, the second L2 address 1140 is a source L2 address and the message further includes a destination L2 address of the second UE.

The IP address manager 1130 may manage IP addresses 1155 of one or more application layer processes. In some cases, the message further includes an encrypted second IE containing a second IP address that is different than a first IP address of the first set of identifiers. The IP address manager 1130 may exchange with the V2X connection and communication component 1110 the IP addresses 1155 received or transmitted in the message.

The MIC component 1135 may compute a MIC 1160 and transmit the MIC 1160 to the V2X connection and communication component 1110 to add to the message using the second L2 address. The MIC 1160 of the message may be based on one or more of the first set of identifiers. In some examples, the MIC component 1135 at the second UE may determine that the message is from the first UE based on receiving a MIC 1160 of the message from the V2X connection and communication component 1110. In some cases, the MIC 1160 is computed based on a key that is derived from the session key ($K_{D\text{-}sess}$) or the session key itself, for direct communications between the first UE and the second UE.

Figure 12:
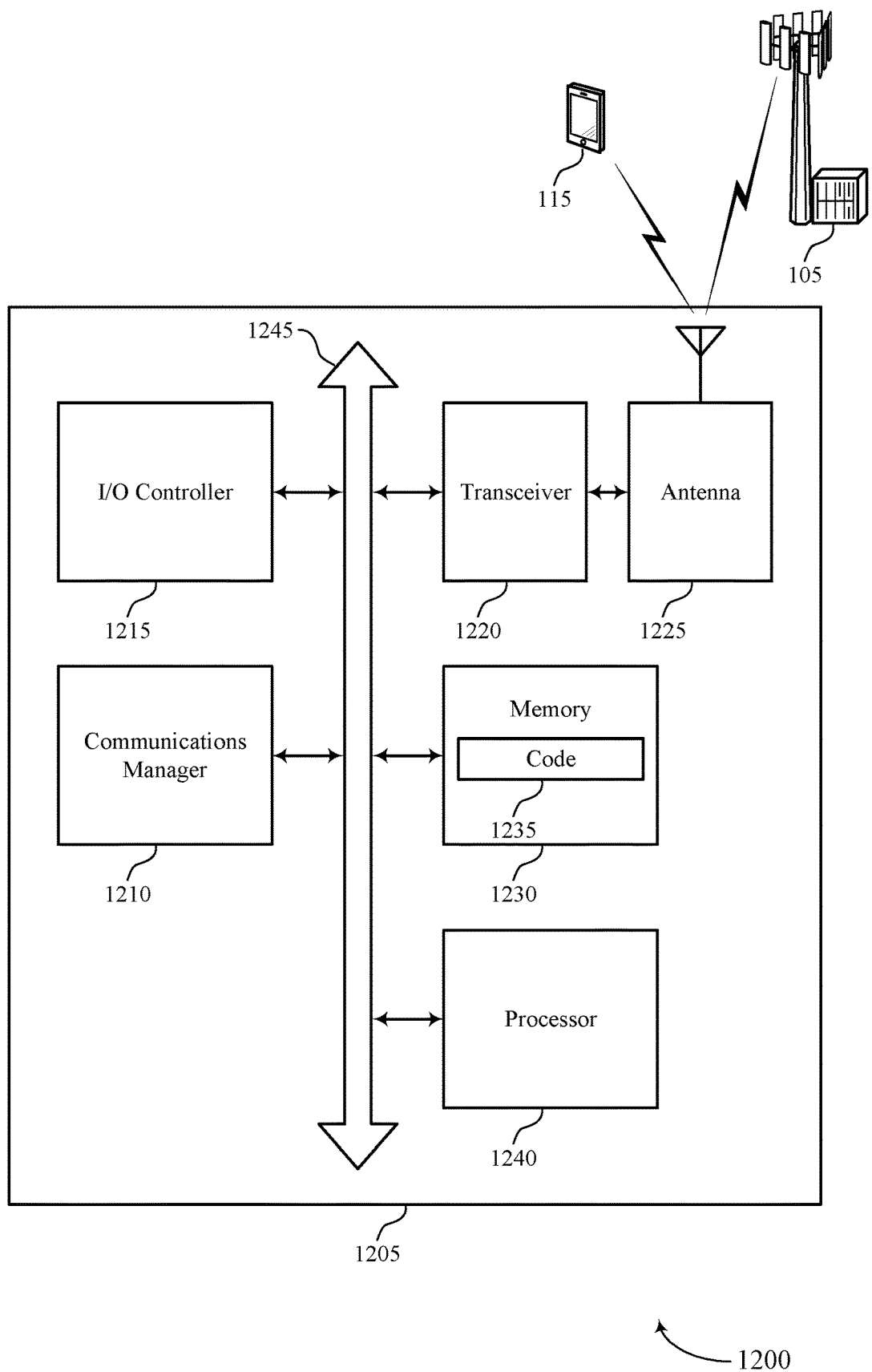
FIG. 12 shows a diagram of a system including a device that supports roll-over of identifiers and keys for unicast vehicle to vehicle communication links in accordance with aspects of the present disclosure.

FIG. 12 shows a diagram of a system 1200 including a device 1205 that supports roll-over of identifiers and keys for unicast vehicle to vehicle communication links in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210, when device 1205 is a first UE that transmits a message, may establish, at the first UE, a V2X unicast communications link between the first UE and a second UE, where the first UE has a first set of identifiers associated with the V2X unicast communications link including a first L2 address, transmit, from the first UE to the second UE, a message including a second set of identifiers that is different than the first set of identifiers, the second set of identifiers including a second L2 address different from the first L2 address, and communicate with the second UE via the V2X unicast communications link using the second set of identifiers.

The communications manager 1210, when device 1205 is a second UE that receives a message, may establish, at the second UE, a V2X unicast communications link with a first UE, where the first UE has a first set of identifiers associated with the V2X unicast communications link including a first L2 address, receive, from the first UE, a message including a second set of identifiers that are different than the first set of identifiers, the second set of identifiers including a second L2 address different than the first L2 address, and communicate with the first UE via the V2X unicast communications link using the second set of identifiers.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting roll-over of identifiers and keys for unicast vehicle to vehicle communication links).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
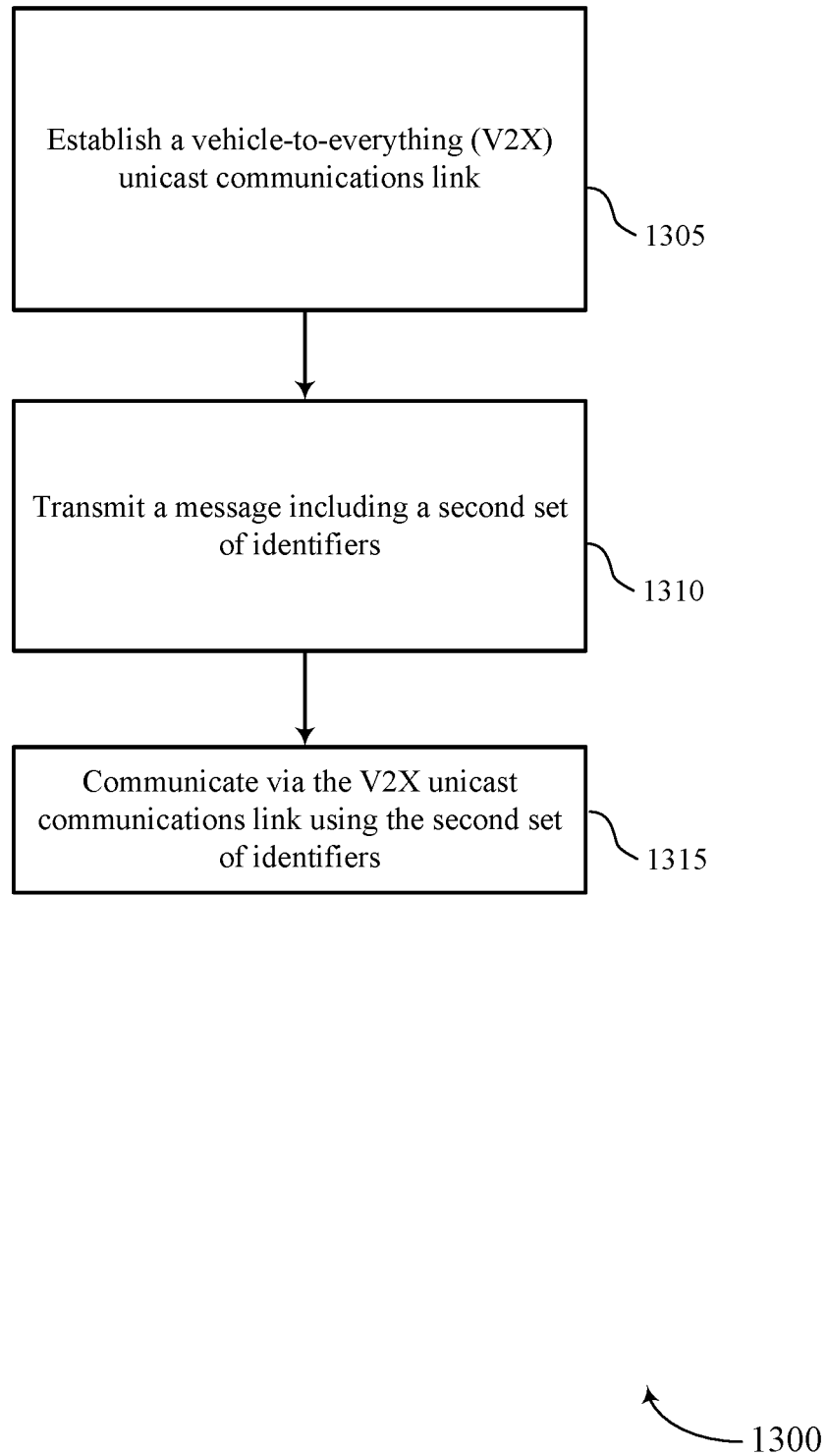
FIGS. 13 through 20 show flowcharts illustrating methods that support roll-over of identifiers and keys for unicast vehicle to vehicle communication links in accordance with aspects of the present disclosure.

FIG. 13 shows a flowchart illustrating a method 1300 that supports roll-over of identifiers and keys for unicast vehicle to vehicle communication links in accordance with aspects of the present disclosure. The operations of method 1300 may be implemented by a UE 115 or its components as described herein, which may be an example of a first UE as discussed in various examples herein. For example, the operations of method 1300 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1305, the first UE may establish a V2X unicast communications link between the first UE and a second UE, where the first UE has a first set of identifiers associated with the V2X unicast communications link including a first L2 address. The operations of 1305 may be performed according to the methods described herein. In some examples, aspects of the operations of 1305 may be performed by a connection establishment component as described with reference to FIGS. 9 through 12. In some cases, the V2X unicast communications link may be established as a sidelink communications link between two vehicles and may provide communications for proximity-based services (ProSe). In some cases, the V2X unicast communications link may be established using ProSe direct discovery procedures, ProSe direct communication procedures, and ProSe related security procedures.

In some cases, the first set of identifiers may include one or more lower layer identifiers, such as a MAC address or the first L2 address. In some cases, the first set of identifiers may include one or more security layer identifiers, such as a temporary certificate (e.g., a pseudonym temporary certificate). In some cases, the first set of identifiers may include one or more network/transport layer identifiers, such as a geonetworking address or an IP address. In some cases, the first set of identifiers may include one or more facility layer identifiers, such as a station identifier or temporary identifier associated with a CAM, DENM, or BSM. In some cases, the first set of identifiers may include one or more application layer identifiers, such as a transport protocol ID (e.g., IP address) or an application layer ID (e.g., Station ID). In some cases, the first set of identifiers further include one or more physical layer parameters, such as one or more of a physical layer resource allocation associated with the first UE or a SPS parameter associated with the first UE.

At 1310, the first UE may transmit, to the second UE, a message including a second set of identifiers that is different than the first set of identifiers, the second set of identifiers including a second L2 address different from the first L2 address. For example, the first UE may encode bits that indicate the message, identify time-frequency resources over which the message is to be transmitted, and modulate the transmission over the identified time-frequency resources. The operations of 1310 may be performed according to the methods described herein. In some examples, aspects of the operations of 1310 may be performed by a rekey and ID update manager as described with reference to FIGS. 9 through 12. In some cases, the message includes an encrypted first IE containing the second L2 address. In some cases, the message further includes an encrypted second IE containing a second IP address that is different than a first IP address of the first set of identifiers. In some cases, the entire message is encrypted based on one or more of the first set of identifiers and keys.

In some cases, the second L2 address is a source L2 address and the message further includes a destination L2 address of the second UE. In some cases, the second set of identifiers include at least two identifiers that are different from corresponding identifiers of the first set of identifiers. In some cases, the second set of identifiers include different values for each identifier of the first set of identifiers, which may enhance privacy of the V2X communications link.

At 1315, the UE may communicate with the second UE via the V2X unicast communications link using the second set of identifiers. For example, the second UE may be associated with the second set of identifiers, and the first UE may include one or more identifiers of the second set of identifiers in data communications associated with the second UE. The operations of 1315 may be performed according to the methods described herein. In some examples, aspects of the operations of 1315 may be performed by a V2X communication component as described with reference to FIGS. 9 through 12.

Figure 14:
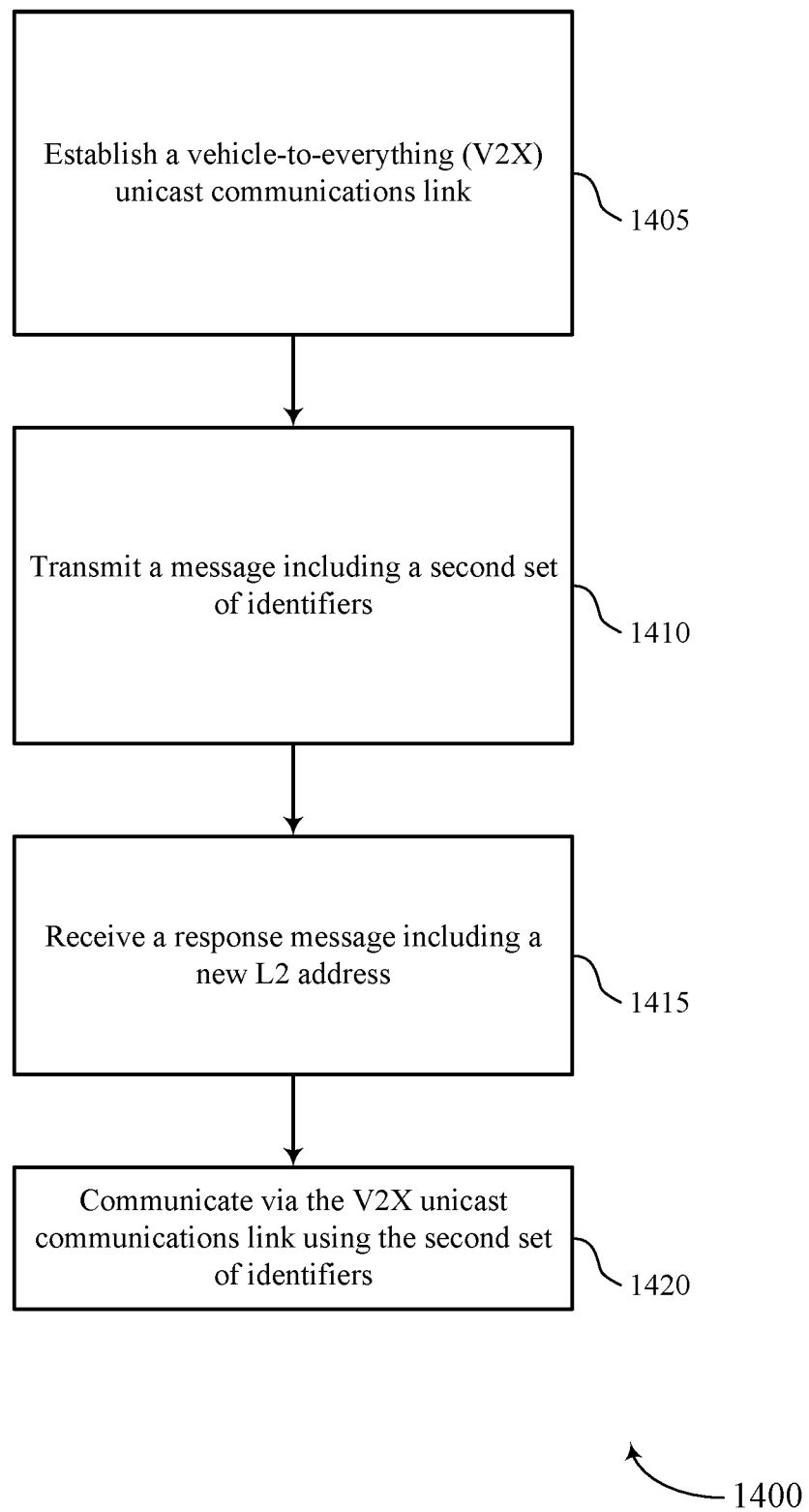

FIG. 14 shows a flowchart illustrating a method 1400 that supports roll-over of identifiers and keys for unicast vehicle to vehicle communication links in accordance with aspects of the present disclosure. The operations of method 1400 may be implemented by a UE 115 or its components as described herein, which may be an example of a first UE as discussed in various examples herein. For example, the operations of method 1400 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1405, the first UE may establish a V2X unicast communications link between the first UE and a second UE, where the first UE has a first set of identifiers associated with the V2X unicast communications link including a first L2 address. The operations of 1405 may be performed according to the methods described herein. In some examples, aspects of the operations of 1405 may be performed by a connection establishment component as described with reference to FIGS. 9 through 12.

At 1410, the first UE may transmit, to the second UE, a message including a second set of identifiers that is different than the first set of identifiers, the second set of identifiers including a second L2 address different from the first L2 address. For example, the first UE may encode bits that indicate the message, identify time-frequency resources over which the message is to be transmitted, and modulate the transmission over the identified time-frequency resources. The operations of 1410 may be performed according to the methods described herein. In some examples, aspects of the operations of 1410 may be performed by a rekey and ID update manager as described with reference to FIGS. 9 through 12.

At 1415, the first UE may receive, from the second UE, a response message, where the response message includes a new L2 address of the second UE that is different than a prior L2 address of the second UE. For example, the first UE may identify time-frequency resources over which the response message may be transmitted from the second UE. The first UE may demodulate the transmission over those time-frequency resources and decode the demodulated transmission to obtain bits that indicate the response message. The operations of 1415 may be performed according to the methods described herein. In some examples, aspects of the operations of 1415 may be performed by a L2 address manager as described with reference to FIGS. 9 through 12.

At 1420, the first UE may communicate with the second UE via the V2X unicast communications link using the second set of identifiers. For example, the second UE may be associated with the second set of identifiers, and the first UE may include one or more identifiers of the second set of identifiers in data communications associated with the second UE. The operations of 1420 may be performed according to the methods described herein. In some examples, aspects of the operations of 1420 may be performed by a V2X communication component as described with reference to FIGS. 9 through 12. In some cases, the new L2 address of the second UE may be used for communication. In some cases, updated identifiers of the second UE may be determined and used for communication with the second UE, such as updated identifiers for each type of identifier of the first set of identifiers.

Figure 15:
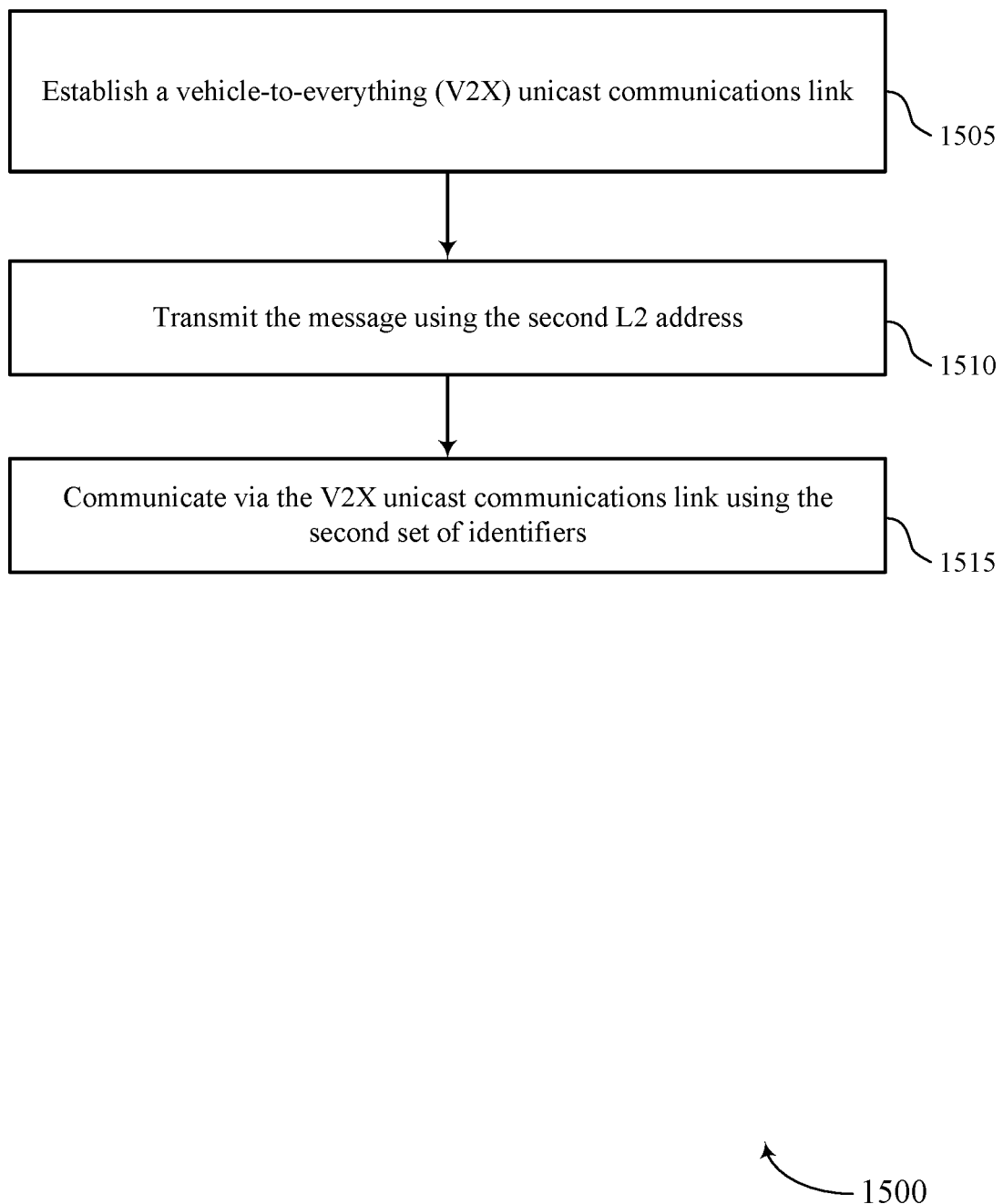

FIG. 15 shows a flowchart illustrating a method 1500 that supports roll-over of identifiers and keys for unicast vehicle to vehicle communication links in accordance with aspects of the present disclosure. The operations of method 1500 may be implemented by a UE 115 or its components as described herein, which may be an example of a first UE as discussed in various examples herein. For example, the operations of method 1500 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1505, the first UE may establish a V2X unicast communications link between the first UE and a second UE, where the first UE has a first set of identifiers associated with the V2X unicast communications link including a first L2 address. The operations of 1505 may be performed according to the methods described herein. In some examples, aspects of the operations of 1505 may be performed by a connection establishment component as described with reference to FIGS. 9 through 12.

At 1510, the first UE may transmit, to the second UE, a message using the second L2 address, where a MIC of the message is based on one or more of the first set of identifiers. For example, the first UE may encode bits that indicate the message, identify time-frequency resources over which the message is to be transmitted, and modulate the transmission over the identified time-frequency resources. The operations of 1515 may be performed according to the methods described herein. In some examples, aspects of the operations of 1515 may be performed by a MIC component as described with reference to FIGS. 9 through 12. In some cases, the MIC may be computed based on a session key ($K_{D\text{-}sess}$) or on a key derived from the session key, for direct communications between the first UE and the second UE.

At 1515, the first UE may communicate with the second UE via the V2X unicast communications link using the second set of identifiers. For example, the second UE may be associated with the second set of identifiers, and the first UE may include one or more identifiers of the second set of identifiers in data communications associated with the second UE. The operations of 1515 may be performed according to the methods described herein. In some examples, aspects of the operations of 1515 may be performed by a V2X communication component as described with reference to FIGS. 9 through 12.

Figure 16:
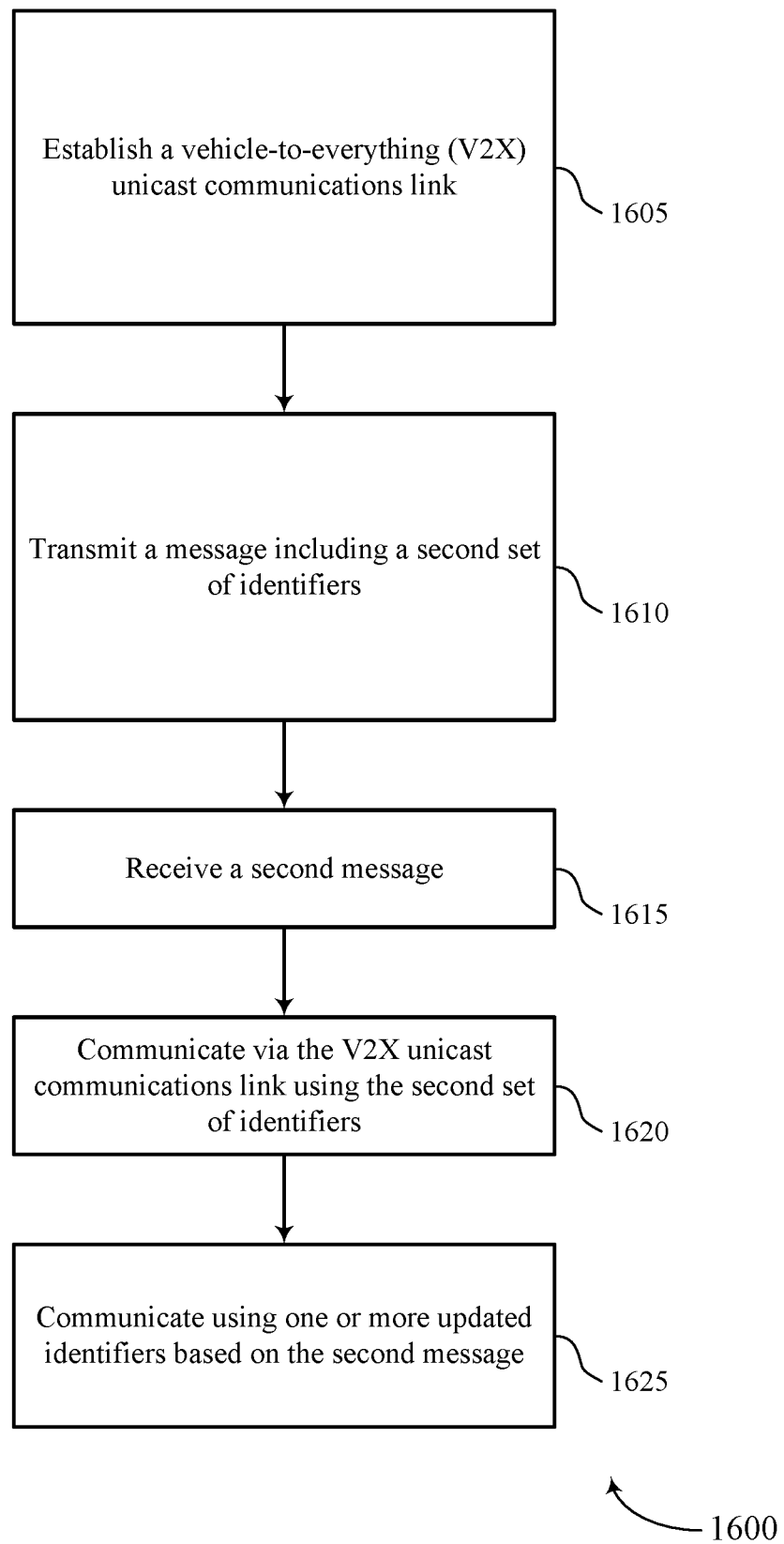

FIG. 16 shows a flowchart illustrating a method 1600 that supports roll-over of identifiers and keys for unicast vehicle to vehicle communication links in accordance with aspects of the present disclosure. The operations of method 1600 may be implemented by a UE 115 or its components as described herein, which may be an example of a first UE as discussed in various examples herein. For example, the operations of method 1600 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1605, the first UE may establish V2X unicast communications link between the first UE and a second UE, where the first UE has a first set of identifiers associated with the V2X unicast communications link including a first L2 address. The operations of 1605 may be performed according to the methods described herein. In some examples, aspects of the operations of 1605 may be performed by a connection establishment component as described with reference to FIGS. 9 through 12.

At 1610, the first UE may transmit, to the second UE, a message including a second set of identifiers that is different than the first set of identifiers, the second set of identifiers including a second L2 address different from the first L2 address. For example, the first UE may encode bits that indicate the message, identify time-frequency resources over which the message is to be transmitted, and modulate the transmission over the identified time-frequency resources. The operations of 1610 may be performed according to the methods described herein. In some examples, aspects of the operations of 1610 may be performed by a rekey and ID update manager as described with reference to FIGS. 9 through 12.

At 1615, the first UE may receive, from the second UE, a second message. For example, the first UE may identify time-frequency resources over which the second message may be transmitted from the second UE. The first UE may demodulate the transmission over those time-frequency resources and decode the demodulated transmission to obtain bits that indicate the second message. The operations of 1615 may be performed according to the methods described herein. In some examples, aspects of the operations of 1615 may be performed by a rekey and ID update manager as described with reference to FIGS. 9 through 12.

At 1620, the first UE may communicate with the second UE via the V2X unicast communications link using the second set of identifiers. For example, the second UE may be associated with the second set of identifiers, and the first UE may include one or more identifiers of the second set of identifiers in data communications associated with the second UE. The operations of 1620 may be performed according to the methods described herein. In some examples, aspects of the operations of 1620 may be performed by a V2X communication component as described with reference to FIGS. 9 through 12.

At 1625, the first UE may communicate with the second UE using one or more updated identifiers of the second UE that are determined based on the second message. For example, the second UE may be associated with the updated identifiers, and the first UE may include one or more of the updated identifiers in data communications associated with the second UE. The operations of 1625 may be performed according to the methods described herein. In some examples, aspects of the operations of 1625 may be performed by a rekey and ID update manager as described with reference to FIGS. 9 through 12.

Figure 17:
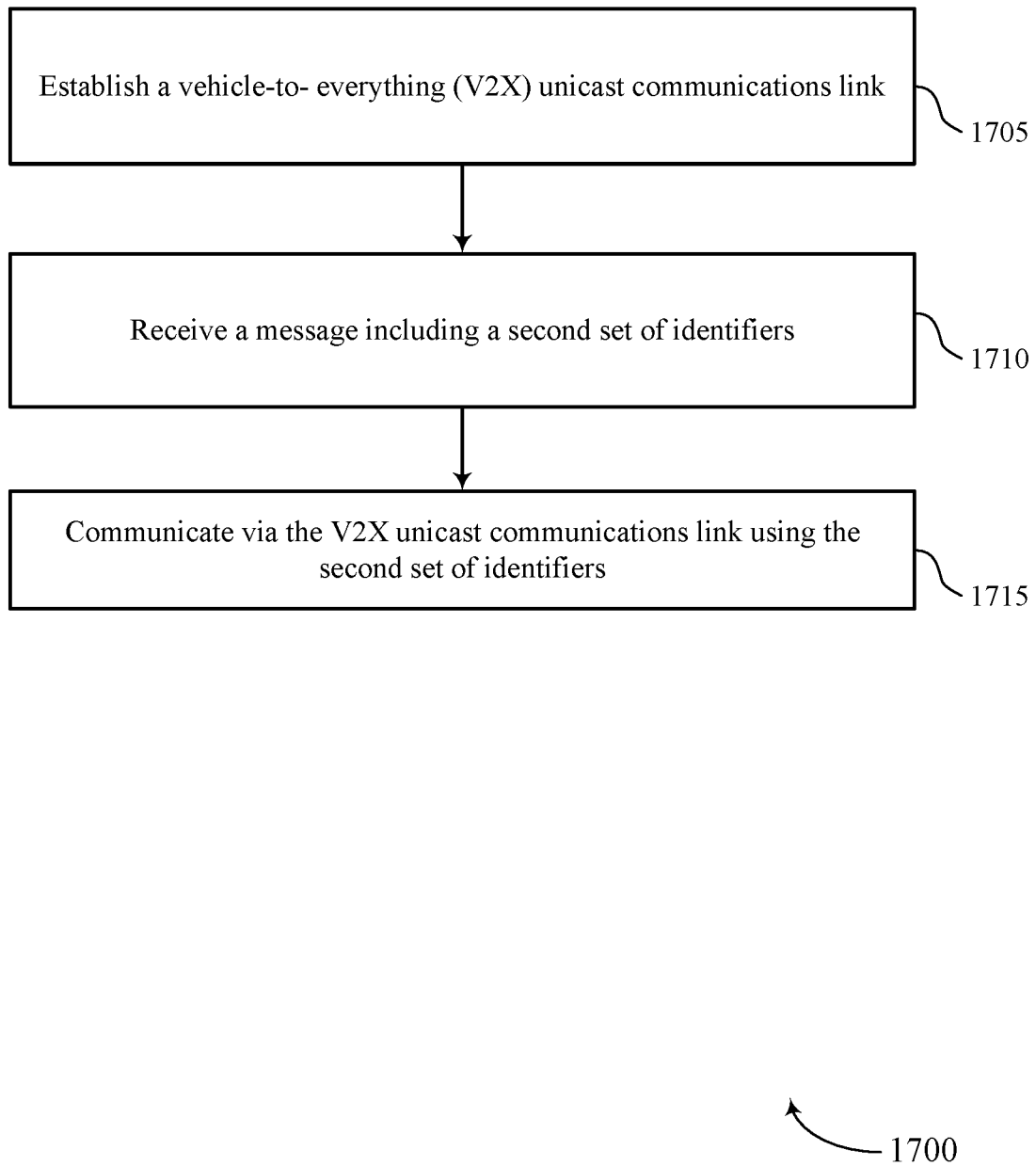

FIG. 17 shows a flowchart illustrating a method 1700 that supports roll-over of identifiers and keys for unicast vehicle to vehicle communication links in accordance with aspects of the present disclosure. The operations of method 1700 may be implemented by a UE 115 or its components as described herein, which may be an example of a second UE in accordance with various examples discussed herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the second UE may establish a V2X unicast communications link with a first UE, where the first UE has a first set of identifiers associated with the V2X unicast communications link including a first L2 address. The operations of 1705 may be performed according to the methods described herein. In some examples, aspects of the operations of 1705 may be performed by a connection establishment component as described with reference to FIGS. 9 through 12. In some cases, the first set of identifiers may include one or more lower layer identifiers, such as a MAC address which may be the first L2 address. In some cases, the first set of identifiers may include one or more security layer identifiers, such as a pseudonym temporary certificate. In some cases, the first set of identifiers may include one or more network/transport layer identifiers, such as a geonetworking address. In some cases, the first set of identifiers may include one or more facility layer identifiers, such as a station identifier or temporary identifier associated with a CAM, DENM, or BSM. In some cases, the first set of identifiers may include one or more application layer identifiers, such as a transport protocol ID (e.g., IP address) or an application layer ID (e.g., Station ID). Additionally or alternatively, the first set of identifiers may include one or more physical layer parameters, such as a physical layer resource allocation associated with the first UE or a SPS parameter associated with the first UE. As discussed above, the first set of identifiers may include any combinations of such identifiers, and in some cases a subset of identifiers are updated upon receiving a message, and other identifiers of the first set of identifiers may be updated based on one or more subsequent transmissions of the first UE.

At 1710, the second UE may receive, from the first UE, a message including a second set of identifiers that are different than the first set of identifiers, the second set of identifiers including a second L2 address different than the first L2 address. For example, the second UE may identify time-frequency resources over which the message may be transmitted from the first UE. The second UE may demodulate the transmission over those time-frequency resources and decode the demodulated transmission to obtain bits that indicate the message. The operations of 1710 may be performed according to the methods described herein. In some examples, aspects of the operations of 1710 may be performed by a rekey and ID update manager as described with reference to FIGS. 9 through 12. In some cases, the message includes an encrypted first IE containing the second L2 address. In some cases, the message further includes an encrypted second IE containing a second IP address that is different than a first IP address of the first set of identifiers. In some cases, the entire message is encrypted based on one or more of the first set of identifiers. In some cases, the second L2 address is a source L2 address and the message further includes a destination L2 address of the second UE.

At 1715, the second UE may communicate with the first UE via the V2X unicast communications link using the second set of identifiers. For example, the first UE may be associated with the second set of identifiers, and the second UE may include one or more identifiers of the second set of identifiers in data communications associated with the first UE. The operations of 1715 may be performed according to the methods described herein. In some examples, aspects of the operations of 1715 may be performed by a V2X communication component as described with reference to FIGS. 9 through 12.

Figure 18:
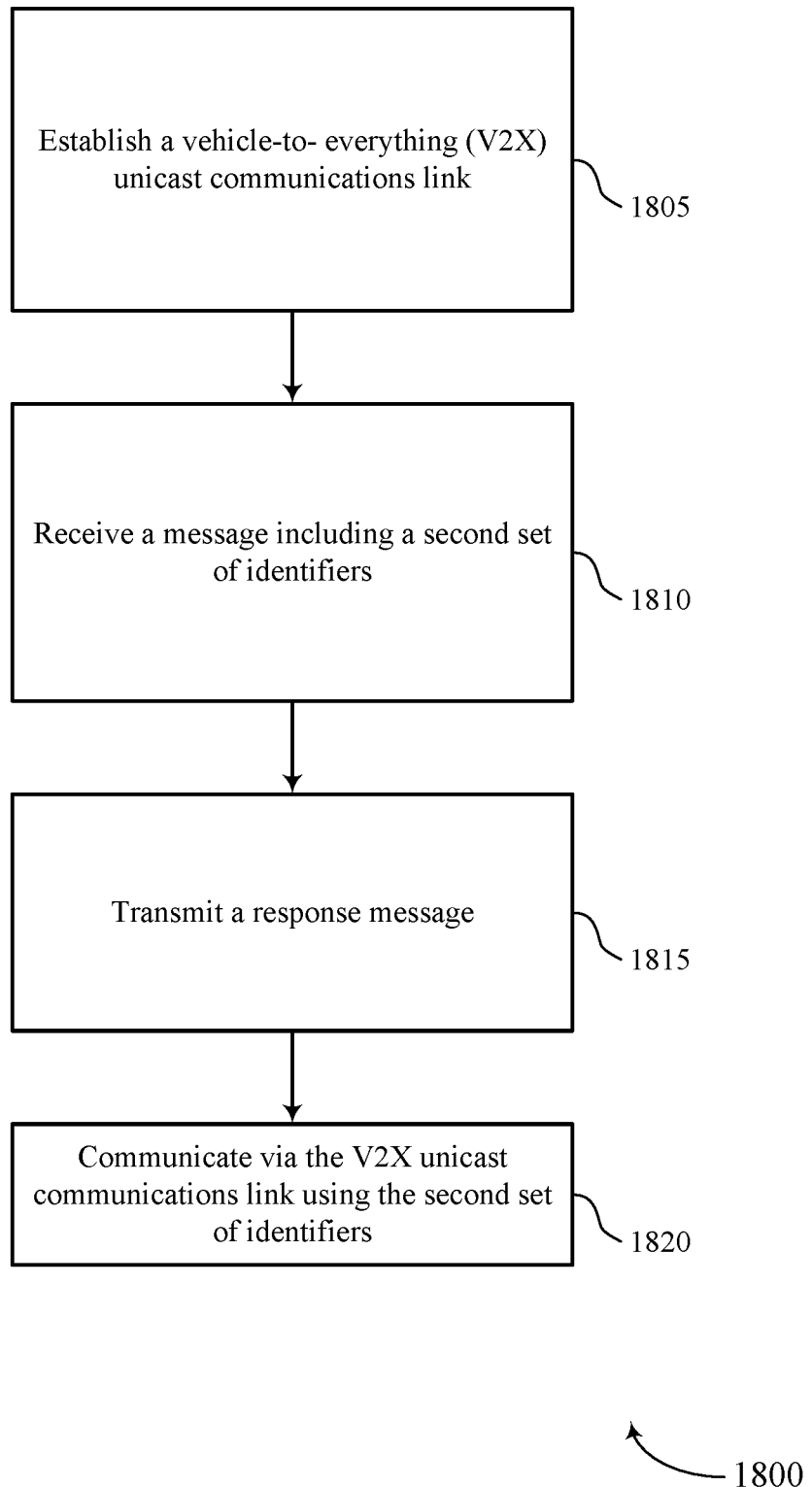

FIG. 18 shows a flowchart illustrating a method 1800 that supports roll-over of identifiers and keys for unicast vehicle to vehicle communication links in accordance with aspects of the present disclosure. The operations of method 1800 may be implemented by a UE 115 or its components as described herein, which may be an example of a second UE in accordance with various examples discussed herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the second UE may establish a V2X unicast communications link with a first UE, where the first UE has a first set of identifiers associated with the V2X unicast communications link including a first L2 address. The operations of 1805 may be performed according to the methods described herein. In some examples, aspects of the operations of 1805 may be performed by a connection establishment component as described with reference to FIGS. 9 through 12.

At 1810, the second UE may receive, from the first UE, a message including a second set of identifiers that are different than the first set of identifiers, the second set of identifiers including a second L2 address different than the first L2 address. For example, the second UE may identify time-frequency resources over which the message may be transmitted from the first UE. The second UE may demodulate the transmission over those time-frequency resources and decode the demodulated transmission to obtain bits that indicate the message. The operations of 1810 may be performed according to the methods described herein. In some examples, aspects of the operations of 1810 may be performed by a rekey and ID update manager as described with reference to FIGS. 9 through 12.

At 1815, the second UE may transmit, to the first UE, a response message, where the response message includes a new L2 address of the second UE that is different than a prior L2 address of the second UE. For example, the second UE may encode bits that indicate the response message, identify time-frequency resources over which the response message is to be transmitted, and modulate the transmission over the identified time-frequency resources. The operations of 1815 may be performed according to the methods described herein. In some examples, aspects of the operations of 1815 may be performed by a L2 address manager as described with reference to FIGS. 9 through 12.

At 1820, the second UE may communicate with the first UE via the V2X unicast communications link using the second set of identifiers. For example, the first UE may be associated with the second set of identifiers, and the second UE may include one or more identifiers of the second set of identifiers in data communications associated with the first UE. The operations of 1820 may be performed according to the methods described herein. In some examples, aspects of the operations of 1820 may be performed by a V2X communication component as described with reference to FIGS. 9 through 12.

Figure 19:
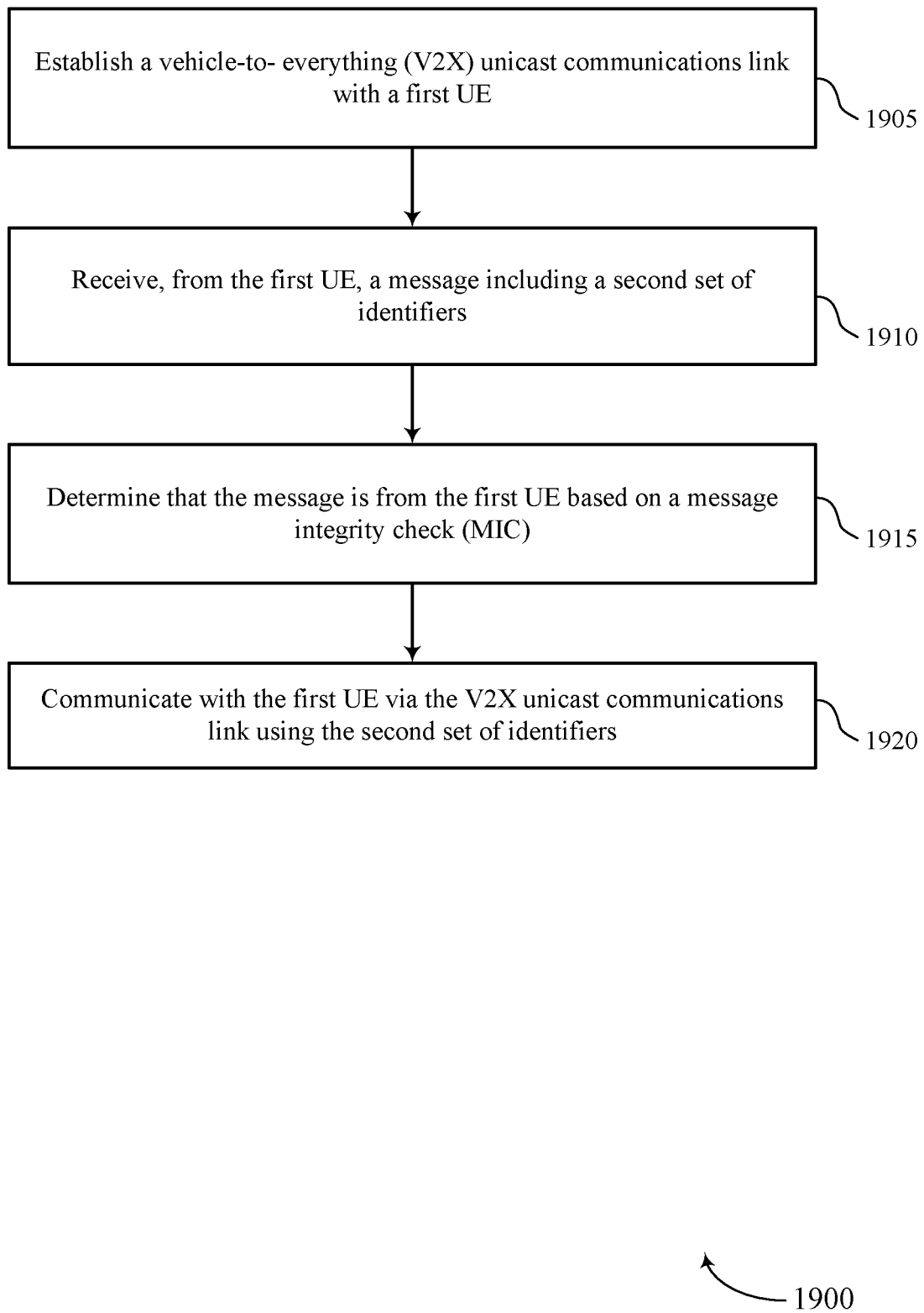

FIG. 19 shows a flowchart illustrating a method 1900 that supports roll-over of identifiers and keys for unicast vehicle to vehicle communication links in accordance with aspects of the present disclosure. The operations of method 1900 may be implemented by a UE 115 or its components as described herein, which may be an example of a second UE in accordance with various examples discussed herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the second UE may establish a V2X unicast communications link with a first UE, where the first UE has a first set of identifiers associated with the V2X unicast communications link including a first L2 address. The operations of 1905 may be performed according to the methods described herein. In some examples, aspects of the operations of 1905 may be performed by a connection establishment component as described with reference to FIGS. 9 through 12.

At 1910, the second UE may receive, from the first UE, a message including a second set of identifiers that are different than the first set of identifiers, the second set of identifiers including a second L2 address different than the first L2 address. For example, the second UE may identify time-frequency resources over which the message may be transmitted from the first UE. The second UE may demodulate the transmission over those time-frequency resources and decode the demodulated transmission to obtain bits that indicate the message. The operations of 1910 may be performed according to the methods described herein. In some examples, aspects of the operations of 1910 may be performed by a rekey and ID update manager as described with reference to FIGS. 9 through 12.

At 1915, the second UE may determine that the message is from the first UE based on a message integrity check (MIC) of the message, where the MIC of the message is based on one or more identifiers of the first set of identifiers. The operations of 1915 may be performed according to the methods described herein. In some examples, aspects of the operations of 1915 may be performed by a MIC component as described with reference to FIGS. 9 through 12. In some cases, the MIC is computed based on a session key ($K_{D\text{-}sess}$) or on a key derived from the session key, for direct communications between the first UE and the second UE, and the second UE may identify the second L2 address based on a source L2 address of the message, and determine that the message is from the first UE based on the session key being for the first UE.

At 1920, the second UE may communicate with the first UE via the V2X unicast communications link using the second set of identifiers. For example, the first UE may be associated with the second set of identifiers, and the second UE may include one or more identifiers of the second set of identifiers in data communications associated with the first UE. The operations of 1920 may be performed according to the methods described herein. In some examples, aspects of the operations of 1920 may be performed by a V2X communication component as described with reference to FIGS. 9 through 12. In some cases, upon determining that the message is from the first UE, the second UE may determine other identifiers of the second set of identifiers, such as a different IP address for the first UE, a different pseudonym temporary certificate, or any other identifier as discussed herein.

Figure 20:
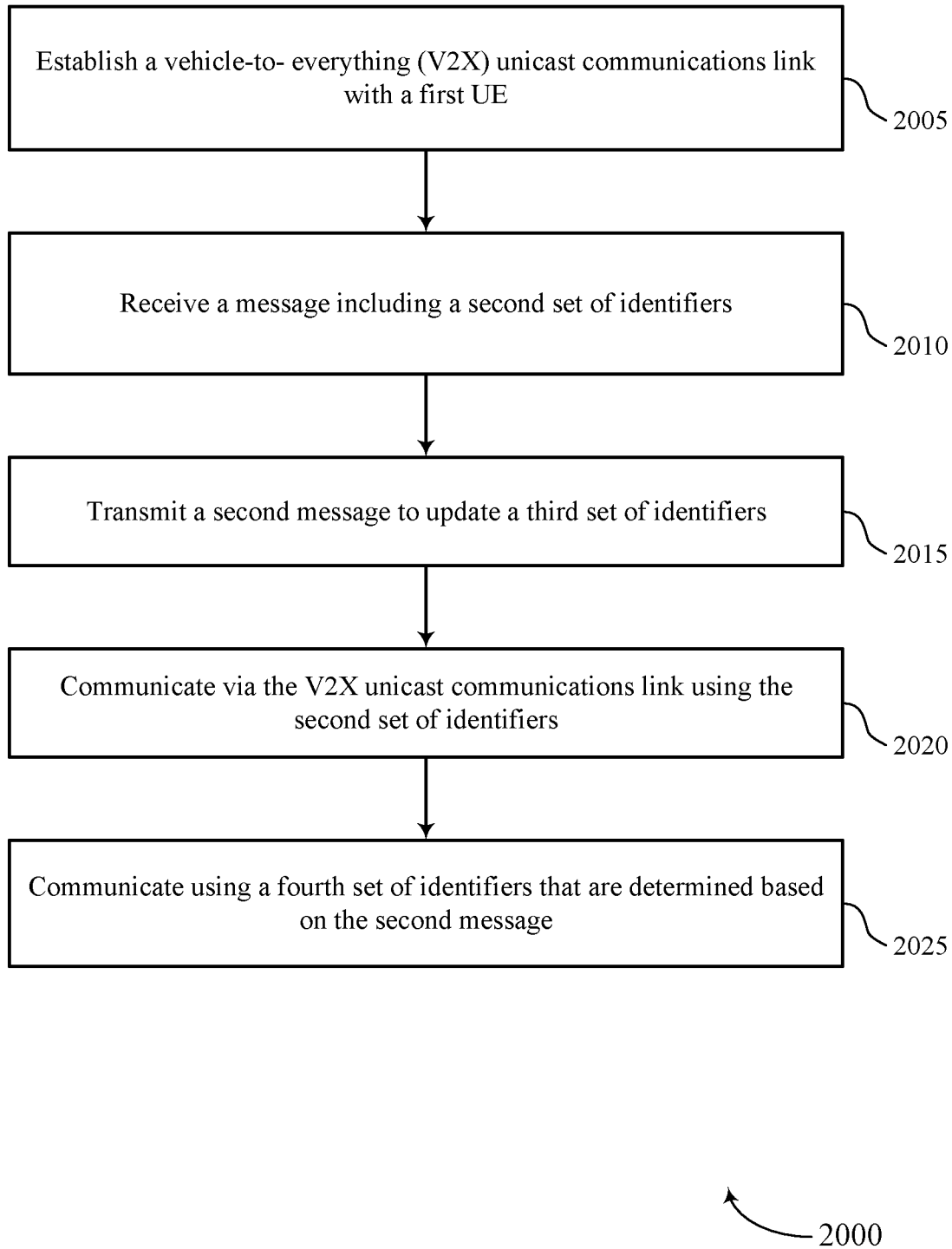

FIG. 20 shows a flowchart illustrating a method 2000 that supports roll-over of identifiers and keys for unicast vehicle to vehicle communication links in accordance with aspects of the present disclosure. The operations of method 2000 may be implemented by a UE 115 or its components as described herein, which may be an example of a second UE in accordance with various examples discussed herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the second UE may establish a V2X unicast communications link with a first UE, where the first UE has a first set of identifiers associated with the V2X unicast communications link including a first L2 address. The operations of 2005 may be performed according to the methods described herein. In some examples, aspects of the operations of 2005 may be performed by a connection establishment component as described with reference to FIGS. 9 through 12.

At 2010, the second UE may receive, from the first UE, a message including a second set of identifiers that are different than the first set of identifiers, the second set of identifiers including a second L2 address different than the first L2 address. For example, the second UE may identify time-frequency resources over which the message may be transmitted from the first UE. The second UE may demodulate the transmission over those time-frequency resources and decode the demodulated transmission to obtain bits that indicate the message. The operations of 2010 may be performed according to the methods described herein. In some examples, aspects of the operations of 2010 may be performed by a rekey and ID update manager as described with reference to FIGS. 9 through 12.

At 2015, the second UE may transmit, to the first UE, a second message to update a third set of identifiers associated with the second UE. For example, the second UE may encode bits that indicate the second message, identify time-frequency resources over which the second message is to be transmitted, and modulate the transmission over the identified time-frequency resources. The operations of 2015 may be performed according to the methods described herein. In some examples, aspects of the operations of 2015 may be performed by a rekey and ID update manager as described with reference to FIGS. 9 through 12.

At 2020, the second UE may communicate with the first UE via the V2X unicast communications link using the second set of identifiers. For example, the first UE may be associated with the second set of identifiers, and the second UE may include one or more identifiers of the second set of identifiers in data communications associated with the first UE. The operations of 2020 may be performed according to the methods described herein. In some examples, aspects of the operations of 2020 may be performed by a V2X communication component as described with reference to FIGS. 9 through 12.

At 2025, the second UE may communicate with the first UE using a fourth set of identifiers that are determined based on the second message, where the fourth set of identifiers are different than the third set of identifiers. For example, the first UE may be associated with the fourth set of identifiers, and the second UE may include one or more identifiers of the fourth set of identifiers in data communications associated with the first UE. The operations of 2025 may be performed according to the methods described herein. In some examples, aspects of the operations of 2025 may be performed by a rekey and ID update manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   establishing, at a first user equipment (UE), a vehicle-to-everything (V2X) unicast communications link between the first UE and a second UE, wherein the first UE has a first set of one or more identifiers associated with the V2X unicast communications link including a first layer-2 (L2) identifier;
   determining to update the first set of one or more identifiers to a second set of one or more identifiers that is different from the first set of one or more identifiers, the second set of one or more identifiers including a second L2 identifier different from the first L2 identifier;
   transmitting, from the first UE to the second UE, a message including the second set of one or more identifiers based at least in part on determining to update the first set of one or more identifiers, wherein the message including the second set of one or more identifiers is transmitted using the first set of one or more identifiers;
   receiving, at the first UE from the second UE, a response message including a new L2 identifier of the second UE that is different from a prior L2 identifier of the second UE; and
   communicating with the second UE based at least in part on receiving the response message, wherein the communicating is via the V2X unicast communications link using the second set of one or more identifiers.

2. The method of claim 1, further comprising:
   establishing a first session key associated with the V2X unicast communications link, wherein the message that includes the second set of one or more identifiers further includes an indication of the first session key.

3. The method of claim 2, further comprising:
   receiving, from the second UE, an indication of a second session key associated with the second L2 identifier; and
   communicating with the second UE via the V2X unicast communications link using the second set of one or more identifiers based at least in part on the second session key.

4. The method of claim 1, wherein the second set of one or more identifiers include a set of one or more application layer identifiers that is different from a set of one or more application layer identifiers of the first set of one or more identifiers.

5. The method of claim 1, wherein the second set of one or more identifiers include a second Internet Protocol (IP) address that is different from a first IP address of the first set of one or more identifiers.

6. The method of claim 1, wherein the message that includes the second set of one or more identifiers is encrypted based on one or more of the first set of one or more identifiers.

7. The method of claim 1, wherein the message that includes the second set of one or more identifiers further includes security information associated with the V2X unicast communications link.

8. A method for wireless communications, comprising:
establishing, at a second user equipment (UE), a vehicle-to-everything (V2X) unicast communications link with a first UE, wherein the first UE has a first set of one or more identifiers associated with the V2X unicast communications link including a first layer-2 (L2) identifier;
receiving, from the first UE, a message including a second set of one or more identifiers that is different from the first set of one or more identifiers, the second set of one or more identifiers including a second L2 identifier that is different from the first L2 identifier, wherein the message including the second set of one or more identifiers is transmitted using the first set of one or more identifiers;
transmitting, from the second UE to the first UE, a response message including a new L2 identifier of the second UE that is different from a prior L2 identifier of the second UE; and
communicating with the first UE based at least in part on transmitting the response message, wherein the communicating is via the V2X unicast communications link using the second set of identifiers.

9. The method of claim 8, further comprising:
identifying, in the message that includes the second set of one or more identifiers, a first session key associated with the V2X unicast communications link.

10. The method of claim 9, further comprising:
transmitting, to the first UE, an indication of a second session key associated with the second L2 identifier; and
communicating with the first UE via the V2X unicast communications link using the second set of one or more identifiers based at least in part on the second session key.

11. The method of claim 8, wherein the second set of one or more identifiers include a set of one or more application layer identifiers that is different from a set of one or more application layer identifiers of the first set of one or more identifiers.

12. The method of claim 8, wherein the second set of one or more identifiers include a second Internet Protocol (IP) address that is different from a first IP address of the first set of one or more identifiers.

13. The method of claim 8, wherein the message that includes the second set of one or more identifiers is encrypted based on one or more of the first set of one or more identifiers.

14. The method of claim 8, wherein the message that includes the second set of one or more identifiers further includes security information associated with the V2X unicast communications link.

15. An apparatus for wireless communications, comprising:
a processor;
memory coupled with the processor; and
instructions stored in the memory and executable by the processor to cause the apparatus to:
establish, at a first user equipment (UE), a vehicle-to-everything (V2X) unicast communications link between the first UE and a second UE, wherein the first UE has a first set of one or more identifiers associated with the V2X unicast communications link including a first layer-2 (L2) identifier;
determine to update the first set of one or more identifiers to a second set of one or more identifiers that is different from the first set of one or more identifiers, the second set of one or more identifiers including a second L2 identifier different from the first L2 identifier;
transmit, from the first UE to the second UE, a message including the second set of one or more identifiers based at least in part on determining to update the first set of one or more identifiers, wherein the message including the second set of one or more identifiers is transmitted using the first set of one or more identifiers;
receive, at the first UE from the second UE, a response message including a new L2 identifier of the second UE that is different from a prior L2 identifier of the second UE; and
communicate with the second UE via the V2X unicast communications link using the second set of one or more identifiers based at least in part on receiving the response message.

16. The apparatus of claim 15, wherein the instructions are further executable by the processor to cause the apparatus to:
establish a first session key associated with the V2X unicast communications link, wherein the message that includes the second set of one or more identifiers further includes an indication of the first session key.

17. The apparatus of claim 16, wherein the instructions are further executable by the processor to cause the apparatus to:
receive, from the second UE, an indication of a second session key associated with the second L2 identifier; and
communicate with the second UE via the V2X unicast communications link using the second set of one or more identifiers based at least in part on the second session key.

18. The apparatus of claim 15, wherein the second set of one or more identifiers include a set of one or more application layer identifiers that is different from a set of one or more application layer identifiers of the first set of one or more identifiers.

19. The apparatus of claim 15, wherein the second set of one or more identifiers include a second Internet Protocol (IP) address that is different from a first IP address of the first set of one or more identifiers.

20. The apparatus of claim 15, wherein the message that includes the second set of one or more identifiers is encrypted based on one or more of the first set of one or more identifiers.

21. The apparatus of claim 15, wherein the message that includes the second set of one or more identifiers further includes security information associated with the V2X unicast communications link.

22. An apparatus for wireless communications, comprising:
a processor;
memory coupled with the processor; and
instructions stored in the memory and executable by the processor to cause the apparatus to:
establish, at a second user equipment (UE), a vehicle-to-everything (V2X) unicast communications link with a first UE, wherein the first UE has a first set of one or more identifiers associated with the V2X unicast communications link including a first layer-2 (L2) identifier;
receive, from the first UE, a message including a second set of one or more identifiers that is different from the first set of one or more identifiers, the second set of one or more identifiers including a second L2 identifier that is different from the first L2 identifier, wherein the message including the second set of one or more identifiers is transmitted using the first set of one or more identifiers;
transmit, from the second UE to the first UE, a response message including a new L2 identifier of the second UE that is different from a prior L2 identifier of the second UE; and
communicate with the first UE based at least in part on transmitting the response message, wherein the communicating is via the V2X unicast communications link using the second set of identifiers.

23. The apparatus of claim 22, wherein the instructions are further executable by the processor to cause the apparatus to:
identify, in the message that includes the second set of one or more identifiers, a first session key associated with the V2X unicast communications link.

24. The apparatus of claim 23, wherein the instructions are further executable by the processor to cause the apparatus to:
transmit, to the first UE, an indication of a second session key associated with the second L2 identifier; and
communicate with the first UE via the V2X unicast communications link using the second set of one or more identifiers based at least in part on the second session key.

25. The apparatus of claim 22, wherein the second set of one or more identifiers include a set of one or more application layer identifiers that is different from a set of one or more application layer identifiers of the first set of one or more identifiers.

26. The apparatus of claim 22, wherein the second set of one or more identifiers include a second Internet Protocol (IP) address that is different from a first IP address of the first set of one or more identifiers.

27. The apparatus of claim 22, wherein the message that includes the second set of one or more identifiers is encrypted based on one or more of the first set of one or more identifiers.

28. The apparatus of claim 22, wherein the message that includes the second set of one or more identifiers includes security information associated with the V2X unicast communications link.

29. An apparatus for wireless communications, comprising:
means for establishing, at a first user equipment (UE), a vehicle-to-everything (V2X) unicast communications link between the first UE and a second UE, wherein the first UE has a first set of one or more identifiers associated with the V2X unicast communications link including a first layer-2 (L2) identifier;
means for determining to update the first set of one or more identifiers to a second set of one or more identifiers that is different from the first set of one or more identifiers, the second set of one or more identifiers including a second L2 identifier different from the first L2 identifier;
means for transmitting, from the first UE to the second UE, a message including the second set of one or more identifiers based at least in part on determining to update the first set of one or more identifiers, wherein the message including the second set of one or more identifiers is transmitted using the first set of one or more identifiers;
means for receiving, at the first UE from the second UE, a response message including a new L2 identifier of the second UE that is different from a prior L2 identifier of the second UE; and
means for communicating with the second UE based at least in part on receiving the response message, wherein the communicating is via the V2X unicast communications link using the second set of one or more identifiers.

30. An apparatus for wireless communications, comprising:
means for establishing, at a second user equipment (UE), a vehicle-to-everything (V2X) unicast communications link with a first UE, wherein the first UE has a first set of one or more identifiers associated with the V2X unicast communications link including a first layer-2 (L2) identifier;
means for receiving, from the first UE, a message including a second set of one or more identifiers that is different from the first set of one or more identifiers, the second set of one or more identifiers including a second L2 identifier that is different from the first L2 identifier, wherein the message including the second set of one or more identifiers is transmitted using the first set of one or more identifiers;
means for transmitting, from the second UE to the first UE, a response message including a new L2 identifier of the second UE that is different from a prior L2 identifier of the second UE; and
means for communicating with the first UE based at least in part on transmitting the response message, wherein the communicating is via the V2X unicast communications link using the second set of identifiers.

* * * * *